July 14, 1953 T. C. SCHENK 2,645,395
BAGGING MACHINE

Filed March 8, 1950 12 Sheets-Sheet 1

INVENTOR
*Tamis C. Schenk*
BY
*Dean Fairbank & Hirsch*
ATTORNEYS

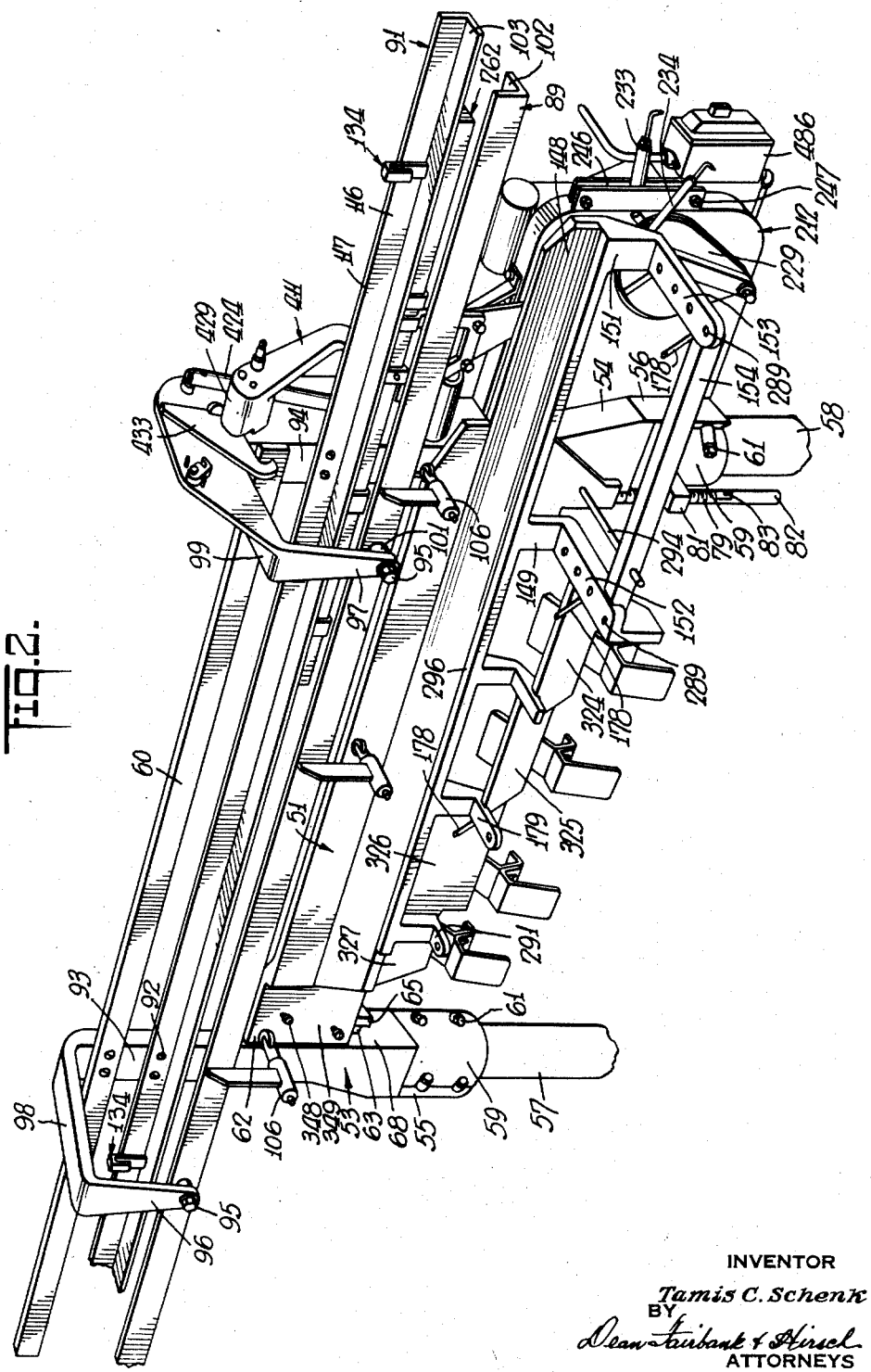

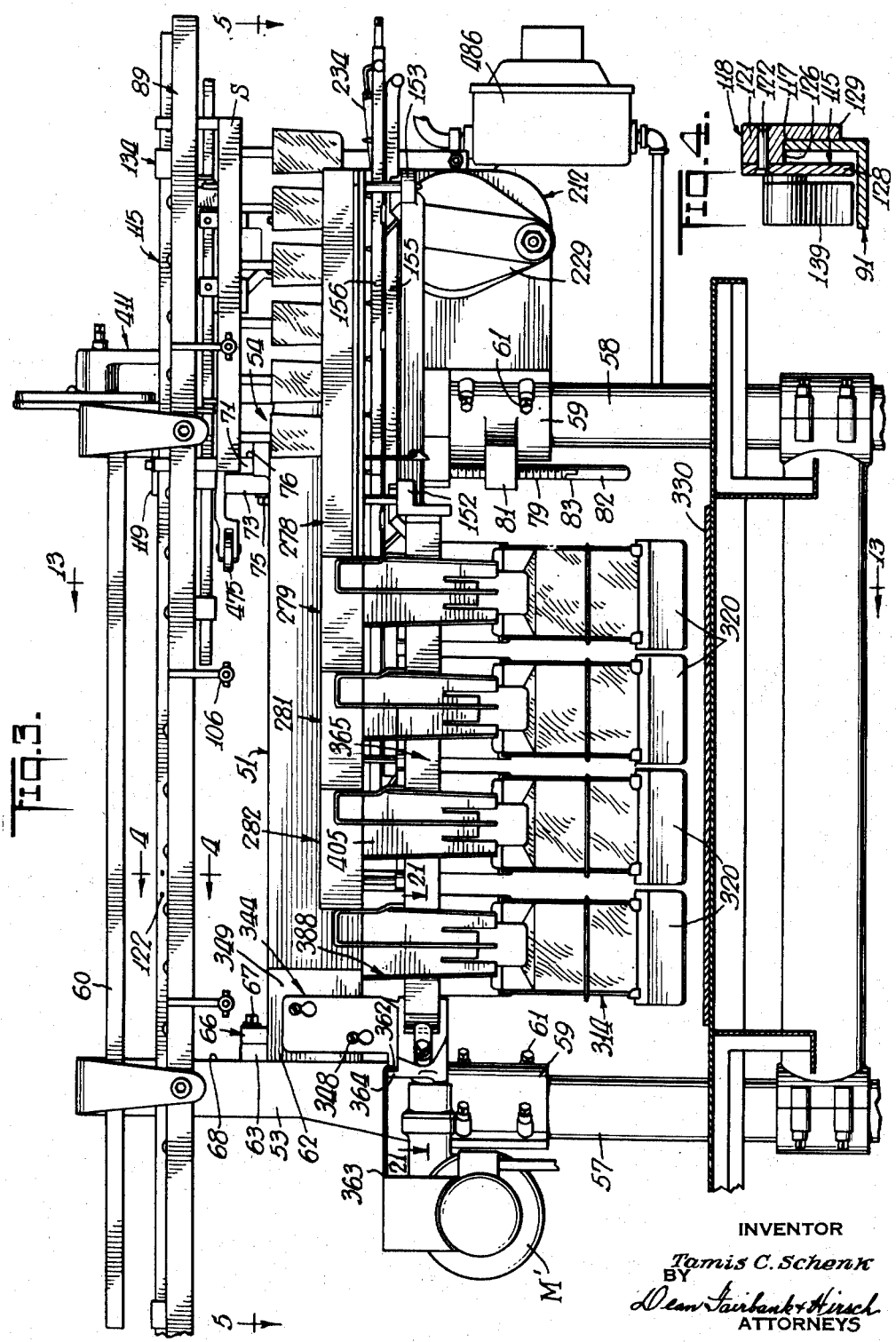

July 14, 1953
T. C. SCHENK
2,645,395
BAGGING MACHINE
Filed March 8, 1950
12 Sheets-Sheet 4
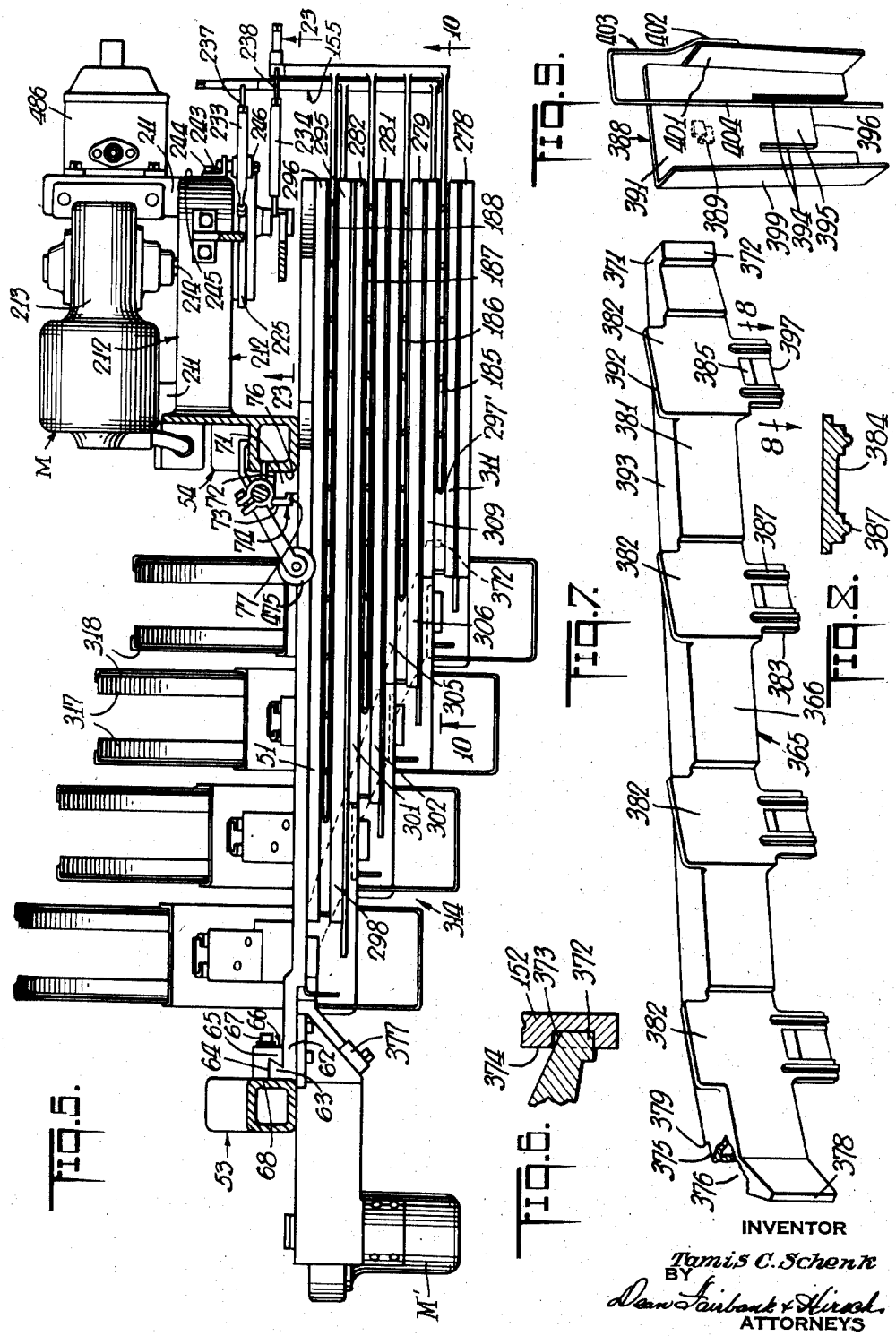
INVENTOR
Tamis C. Schenk
BY
ATTORNEYS

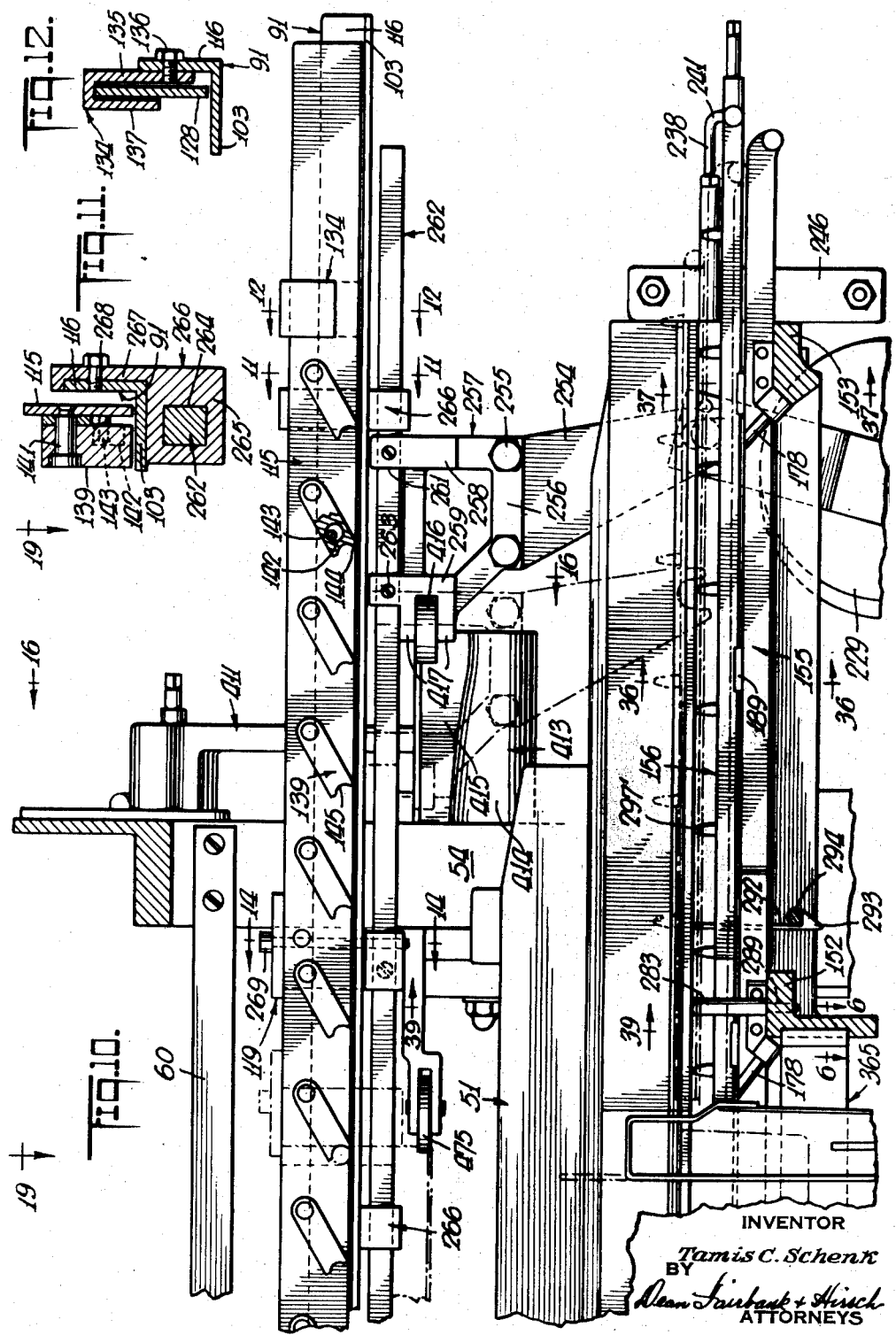

July 14, 1953     T. C. SCHENK     2,645,395
BAGGING MACHINE
Filed March 8, 1950     12 Sheets-Sheet 6
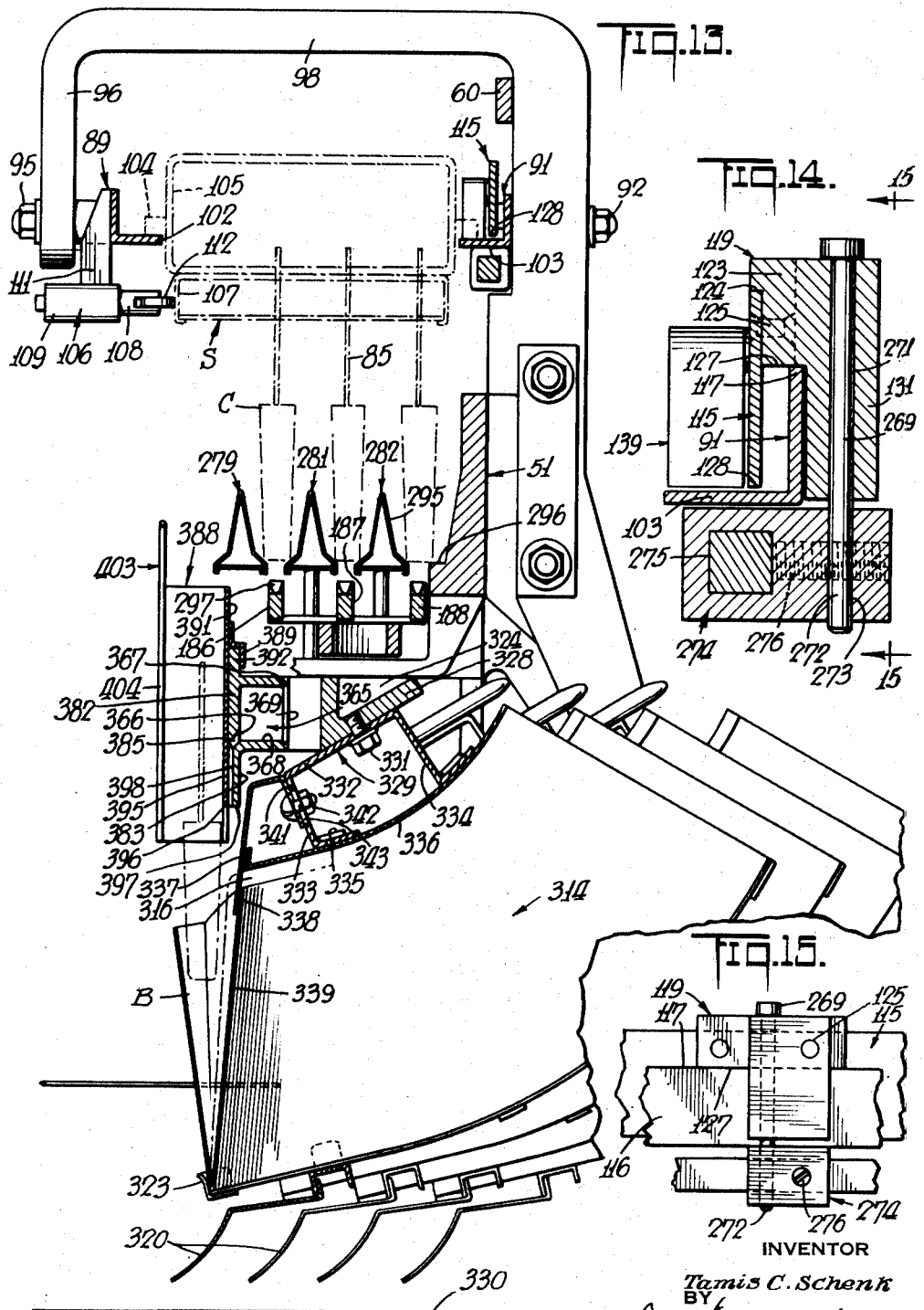
INVENTOR
Tamis C. Schenk
BY
Dean Laurent & Hirsch
ATTORNEYS July 14, 1953
T. C. SCHENK
2,645,395
BAGGING MACHINE
Filed March 8, 1950
12 Sheets-Sheet 7
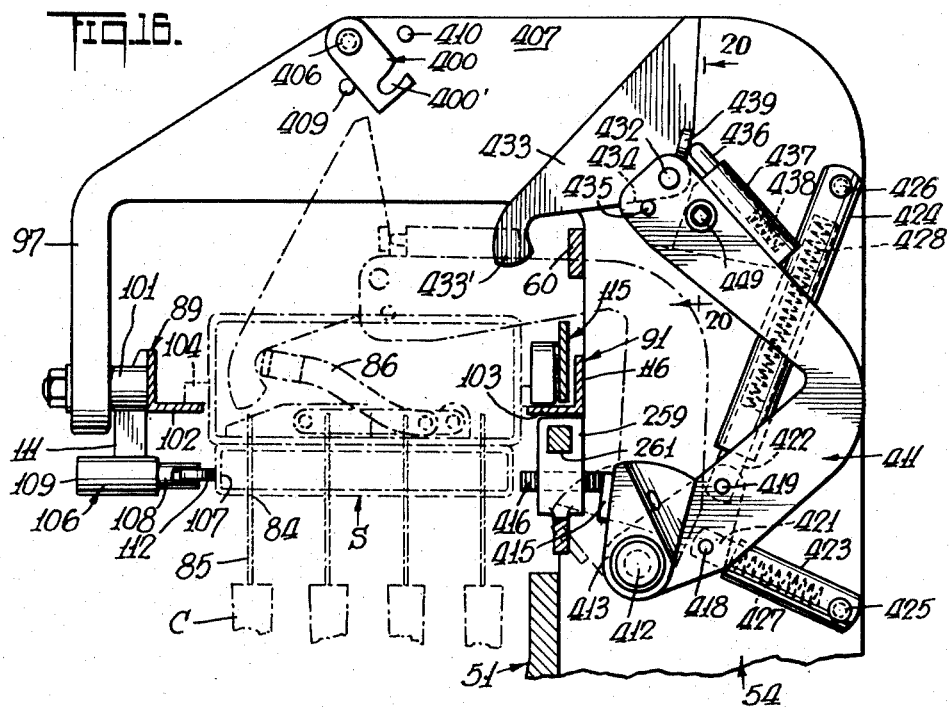
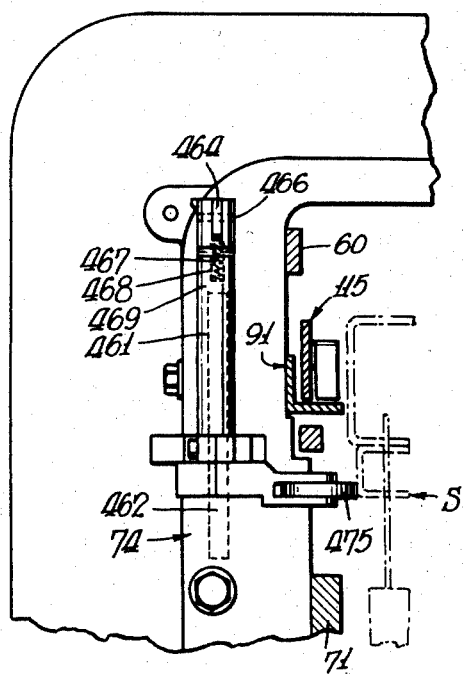
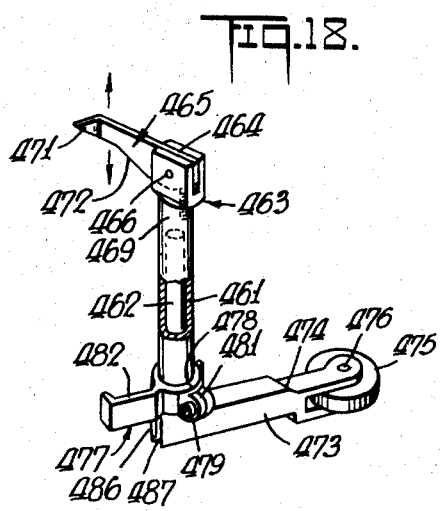
INVENTOR
*Tamis C. Schenk*
BY
*Dean Fairbank & Hirsch*
ATTORNEYS July 14, 1953
T. C. SCHENK
2,645,395
BAGGING MACHINE
Filed March 8, 1950
12 Sheets-Sheet 8
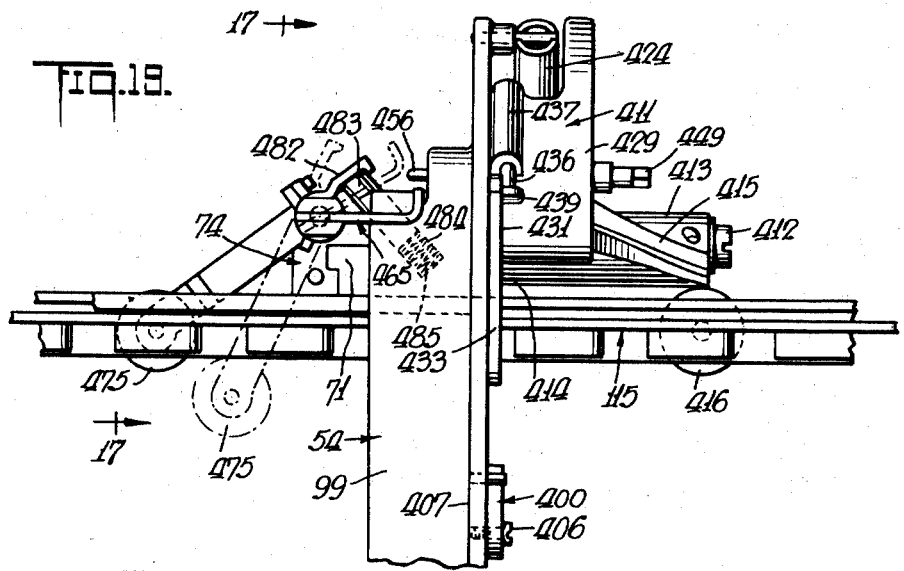
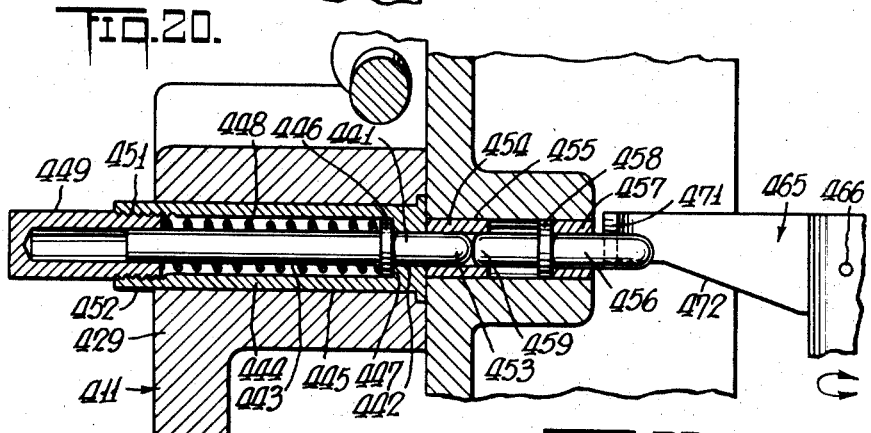
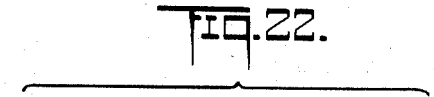
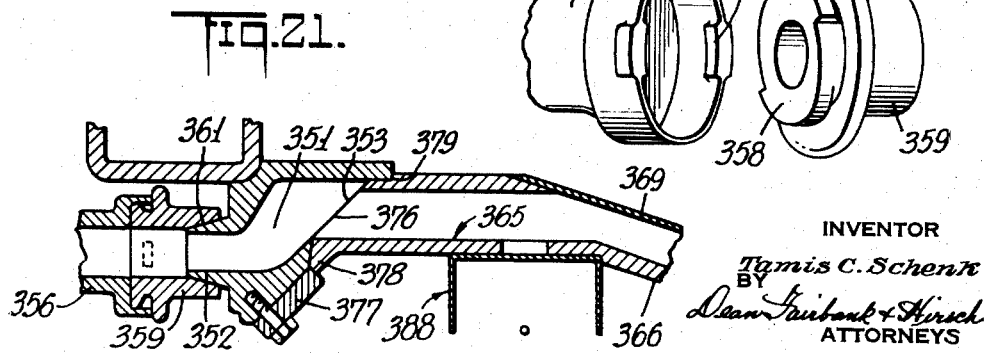
INVENTOR
Tamis C. Schenk
BY
Dean Fairbank & Hirsch
ATTORNEYS July 14, 1953 T. C. SCHENK 2,645,395
BAGGING MACHINE
Filed March 8, 1950 12 Sheets-Sheet 9
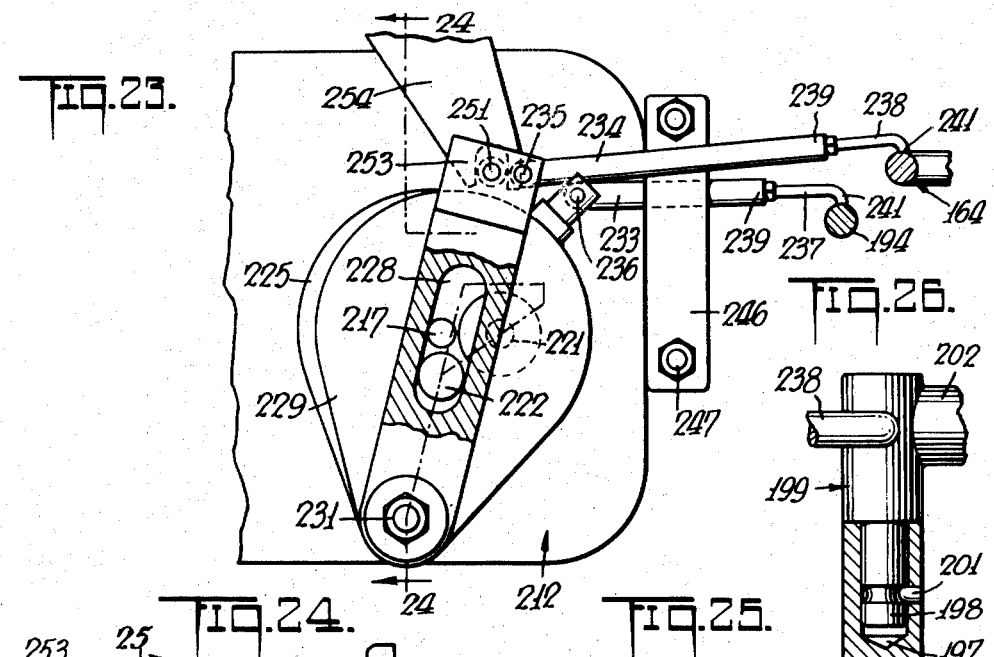
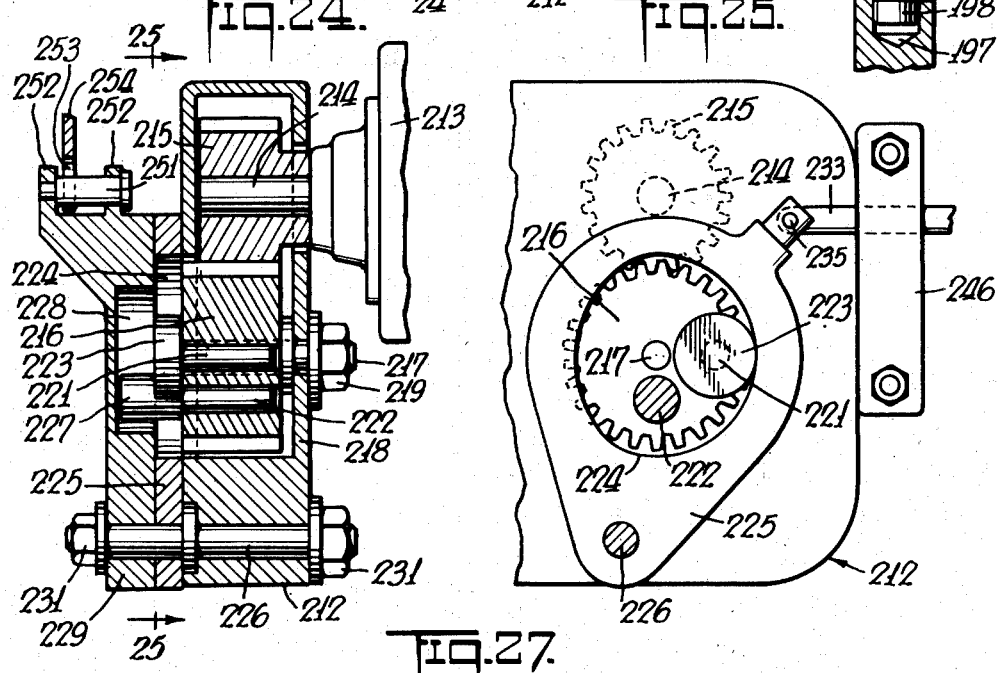
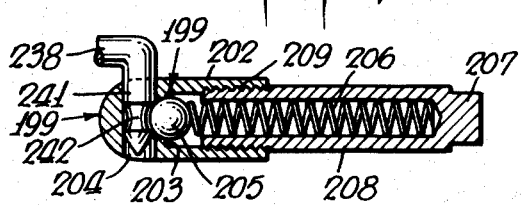
INVENTOR
*Tamis C. Schenk*
BY
*Dean Fairback & Hirsch*
ATTORNEYS July 14, 1953 T. C. SCHENK 2,645,395
BAGGING MACHINE
Filed March 8, 1950 12 Sheets-Sheet 10
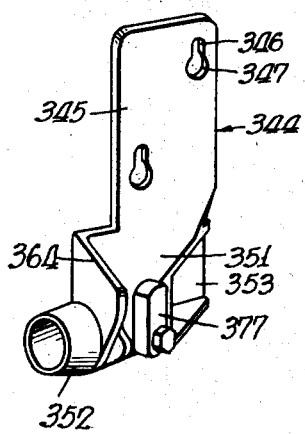
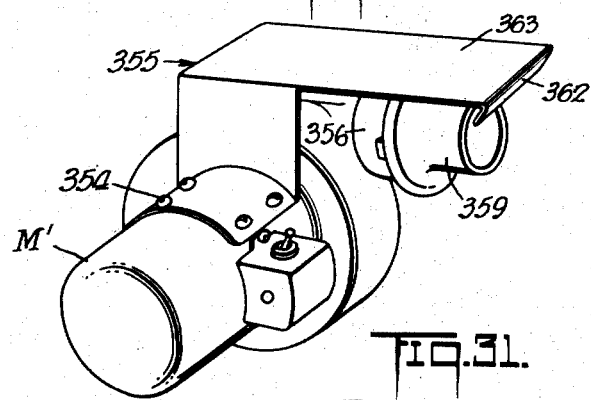
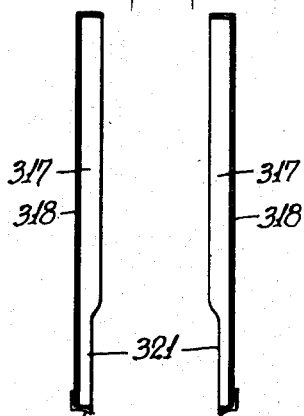
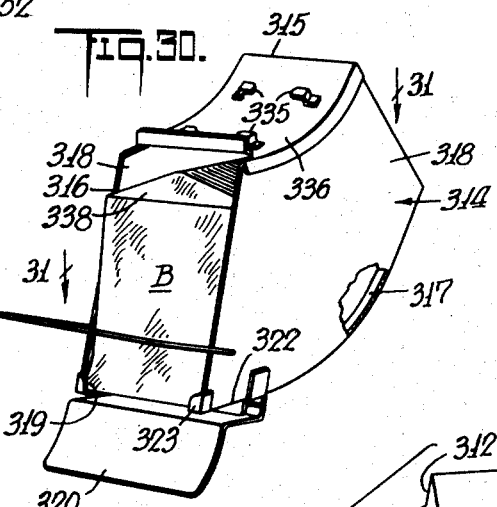
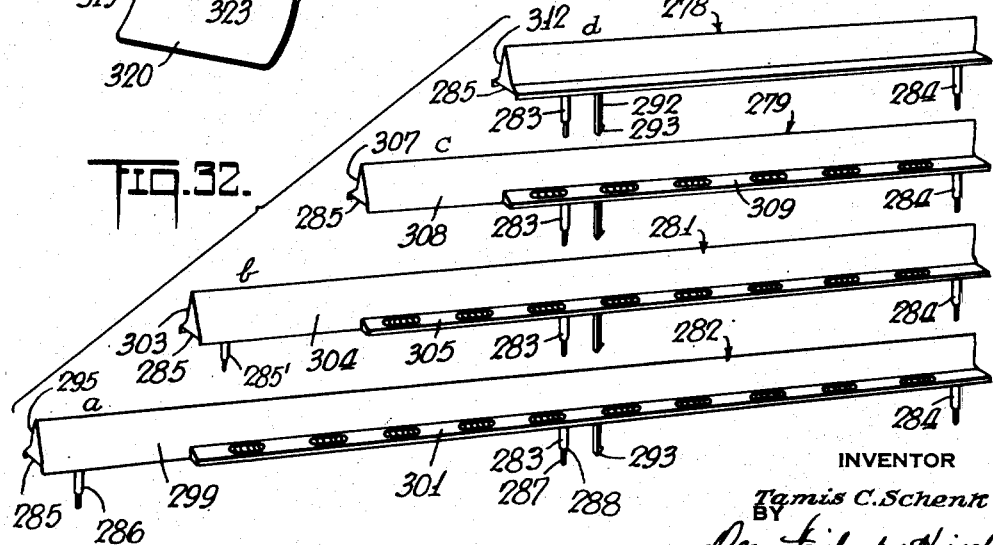
INVENTOR
Tamis C. Schenk
BY
Dean Fairbank & Hirsch
ATTORNEYS

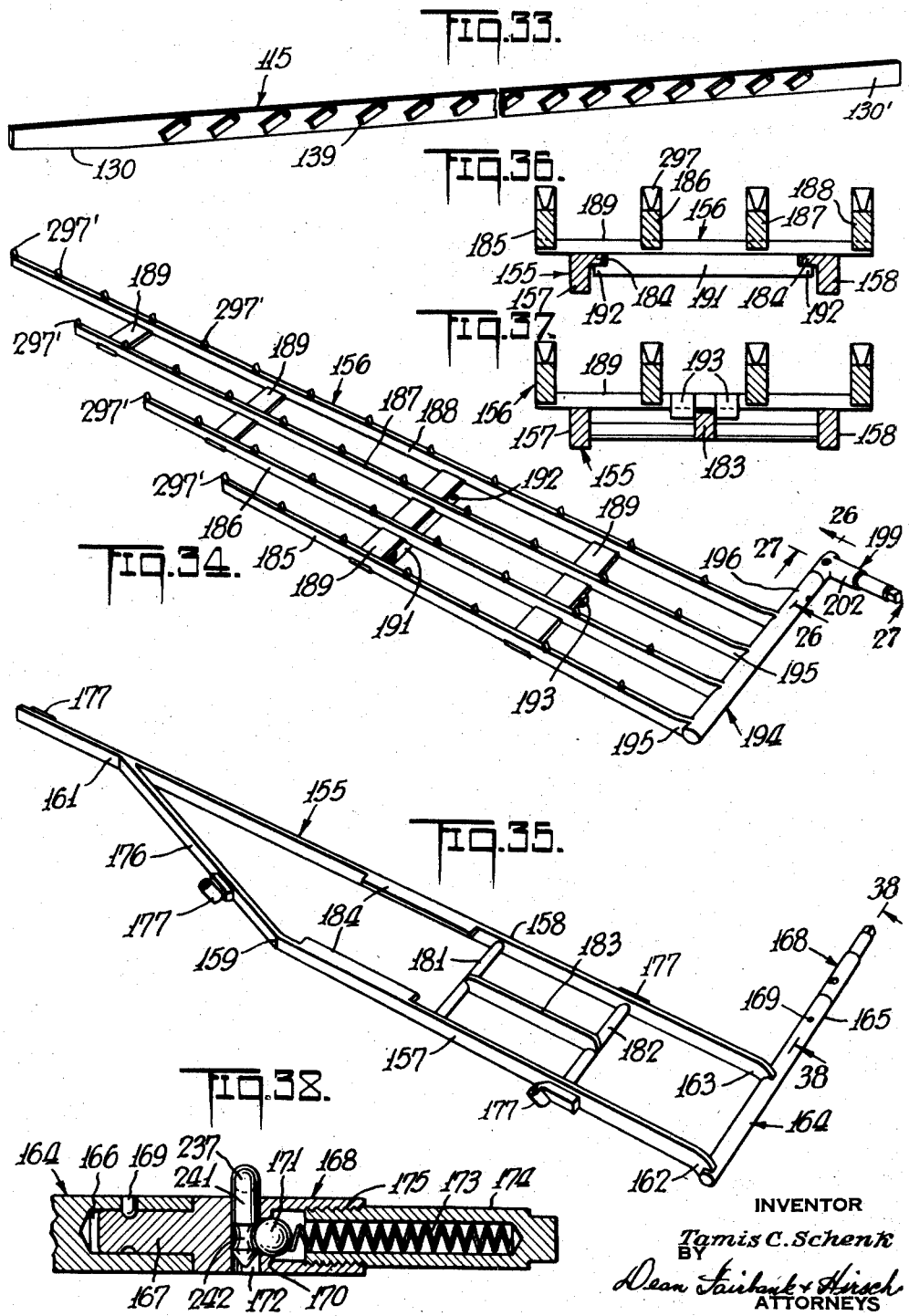

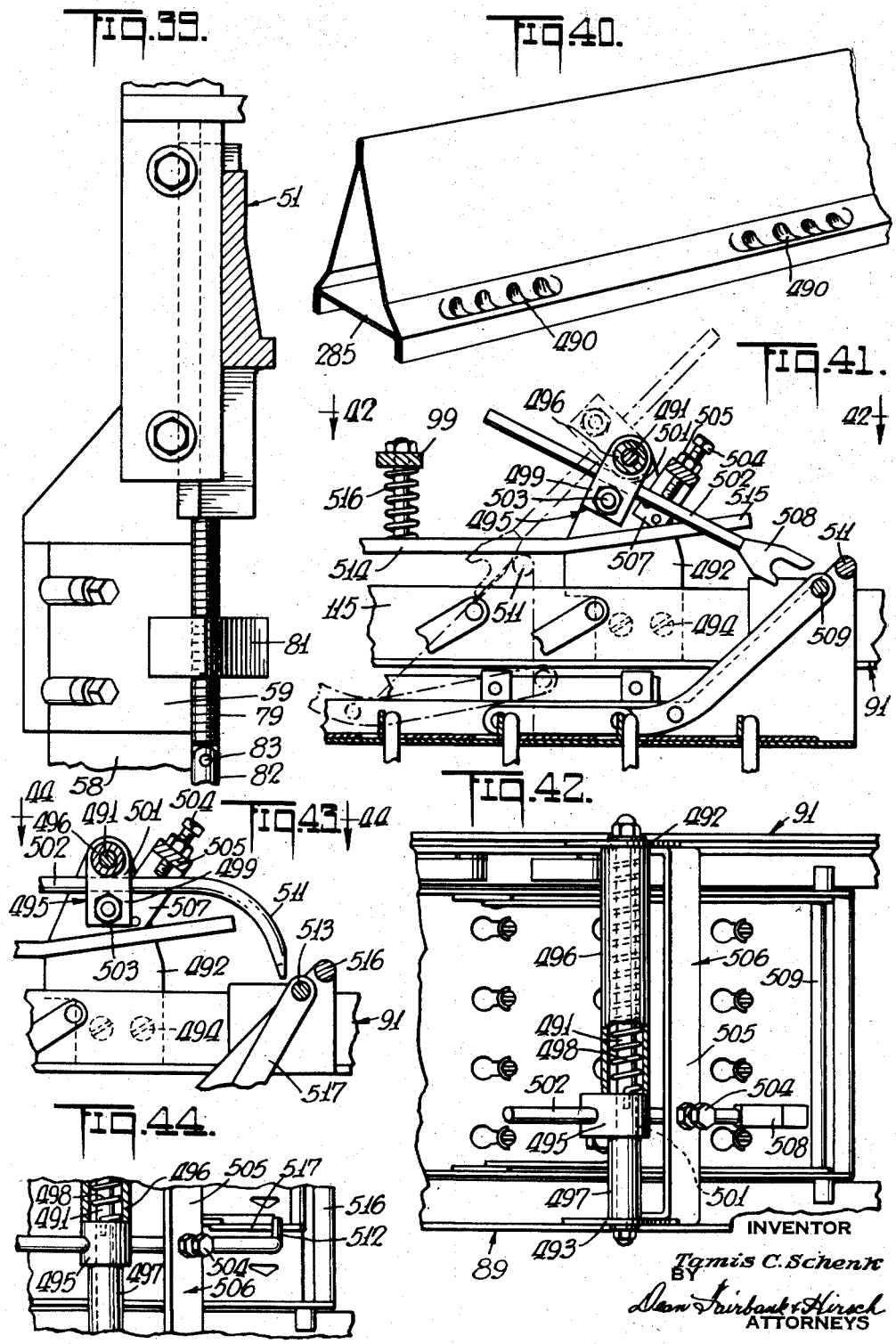

Patented July 14, 1953

2,645,395

UNITED STATES PATENT OFFICE 2,645,395

BAGGING MACHINE

Tamis C. Schenk, Richmond Hill, N. Y., assignor, by mesne assignments, to Fruit Products Corporation, New York, N. Y., a corporation of New York Application March 8, 1950, Serial No. 148,446

30 Claims. (Cl. 226—2)

This invention relates to a bagging machine for packaging confections and more particularly to a machine for bagging stick-held confections such, for example, as the common frozen confection on a stick.

As conducive to a clear understanding of the invention, it is to be noted that as the sale price of the frozen stick-held confection to the ultimate consumer is generally quite low, in the order of five or ten cents, unless the confections can be bagged at a relatively high rate of speed and with a minimum of handling, the cost of packaging is often disproportionate with respect to the cost of the material being packaged.

Where the bagging operation requires that the stick-holders which carry the frozen confections be manually opened and the confections manually removed therefrom to be inserted into individual bags, the operation is extremely time-consuming and expensive, and, therefore, as complete an automatic bagging operation as is possible is desired.

However, if there are any failures in such automatic operation which take any length of time to correct, the frozen confections will melt and hence must be discarded as they would not be saleable. In addition, as such melting would cause dripping on the machine, this would necessitate time-consuming cleaning thereof before operations could again be resumed. Furthermore, when such bagging machine is part of an assembly line including the forming of the confection in brine tanks, the removal therefrom and coating of such confection, any interruption along the assembly line would hold up the other steps and hence, in addition to the frozen confections melting with the difficulties above pointed out, the operators at the various stations would be idle with resultant increase in cost of the confections.

Where the bagging machine is automatic in operation and has a considerable number of operating parts, unless such parts are readily accessible and the machine can be easily disassembled for cleaning it is not likely to meet the rigid sanitary inspection laws which generally govern such food-handling machine and in addition, where the disassembly and reassembly of such machine takes considerable time, the resultant loss of output would result in an increase in the cost of the packaged article.

It is accordingly among the objects of the invention to provide a bagging machine that is fully automatic in operation, will operate at a relatively high speed, is compact and rugged in construction, functions with a minimum number of operating parts, none of which is delicate or apt to become out of order, is capable of continuous operation for long periods without jamming or other malfunctioning and may readily and quickly be disassembled for cleaning and repair, and as quickly reassembled for use, and which machine will reliably and dependably open the stick-holders used therewith to release the confections held herein.

Where the confections, upon being released from the stick-holders are dropped with any appreciable force against a hard surface before being bagged, they are likely to be bruised or cracked and this is especially true when the confections are coated such as with chocolate. And where the confections are slid along some supporting means during their movement through the bagging machine, the bottom of the confections are likely to be scraped and injured. In either case the resultant disfiguration of the product will render the latter unattractive in appearance and unsaleable.

It is accordingly another object of the invention to provide a machine that will bag the stick-held confections without likelihood of injury thereto as by rubbing or dropping thereof against the machine.

Where automatic means are provided to open the stick-holders, which require that the stick-holders be in perfect condition in order that the openers operate properly, as the stick-holders are generally roughly handled even during normal use, such automatic opening means are likely to jam with resultant stoppage of the bagging machine and the consequent difficulties above described, or not open the stick-holders at all, with the result that the confections will be securely retained in the stick-holder and will not be discharged for the bagging operation.

Where the stick-holder when presented to the automatic opener in reverse position, will jam the opening mechanism, in addition to there being a complete stoppage of the bagging operation, the working parts of the machine are likely to break.

It is accordingly still another object of the invention to provide a machine that will dependably open the stick-holder regardless of slight deformation thereof and that will not jam in the event the stick-holder is presented in reverse position to the machine.

Where the bags are retained in vertical position with their mouths directed upwardly to receive the confections to be dropped therein and the confections are not in vertical position when they reach the mouth of the bag, they will not enter the latter with the result that the confections will not be bagged.

It is accordingly still another object to retain the confections in vertical position as they are discharged into the bags without the need for elongated closed chutes in which the confections might jam during their passage therethrough.

It is also to be noted that in the initial forming of the stick-held confections in a mold, an "umbrella" or layer of frozen ice cream joining the tops of the confections is likely to result due to over-filling of the molds or tilting of the molds during the filling operation.

Where such "umbrella" is formed and interferes with the discharge of the confections from the machine, as the confections are extremely hard, they are likely to jam the machine and possibly break the latter.

Even if the connected confections do not jam the machine, if in order to prevent waste thereof, the machine must be stopped in order for the confections to be removed and individually bagged, the stoppage of the assembly line would have the detrimental results heretofore pointed out.

It is accordingly still another object to provide a machine which will operate without jamming regardless of the formation of "umbrellas" on the stick-held confection and from which such confections with "umbrellas" thereon may be removed without stoppage of the machine.

According to the invention the bagging machine includes means to advance the stick-holder to present the latter to a stick-holder opening mechanism for release of the confections onto associated guide rails while still retaining the upper end of the sticks loosely supported in the stick-holder. A conveyer is associated with the guide rails and is positioned below the stick-holder and moves in timed relation with the stick-holder advancing means so that the confections are retained in substantially a vertical position.

The conveyer is desirably constructed to advance the confections along the guide rails without sliding thereon, and when the confections reach the ends of the rails, to successively move the confections off such ends while still retaining them in substantially a vertical position so that they will fall down a vertical discharge chute associated with the ends of the guide rails and into the previously opened mouth of a bag positioned beneath the discharge chute. The bag is so supported that it will remain in confection receiving position until the confection falls therein and thereupon by reason of the weight of the confection will be released from its supporting means to drop with its contained confection onto a suitable conveyer.

More specifically the guide rails are so positioned that when the stick-holder is opened and the sticks released, the bottom edges of the confections will fall but a fraction of an inch thereby minimizing any danger of injury to the confection.

The conveyer desirably advances the confection without rubbing of the latter and to this end includes an elevator which lifts the confection after it has been dropped onto the guide rails, carries it a short distance and thereupon lowers the confection to again deposit it on the guide rails.

This intermittent forward movement of the lower end of the confection is desirably timed with the movement of the stick-holder which also is intermittent so that the upper end of the stick will slide up and down in the stick-holder while the confection is still retained in a vertical position.

By reason of the intermittent advance of the confection, when it is resting on the ends of the guide rails, the next forward motion of the conveyer will cause a finger carried thereby to push the confection forward. As the bottom edge of the confection will rest on the guide rails and the upper end of the stick is supported by the stick-holder, the confection will be retained in substantially vertical position until the finger pushes the lower edge thereof completely off the guide rails at which time it will drop, still in its substantially vertical position, down the discharge chute into the opened mouth of a bag.

In the accompanying drawings in which are shown one or more of various possible embodiments of the several features of the invention.

Fig. 2 is a view similar to Fig. 1 of the bagging machine with parts removed therefrom;

Fig. 3 is a front elevational view of the machine shown in Fig. 1 with parts broken away;

Fig. 4 is a detail sectional view taken along line 4—4 of Fig. 3;

Fig. 5 is a plan view taken along line 5—5 of Fig. 3;

Fig. 6 is a detail sectional view taken along line 6—6 of Fig. 10;

Fig. 7 is a perspective view of the air conduit with parts broken away;

Fig. 8 is a detail sectional view taken along line 8—8 of Fig. 7;

Fig. 9 is a perspective view of the confection chute;

Fig. 10 is a longitudinal fragmentary sectional view of the machine on a larger scale taken along line 10—10 of Fig. 5;

Fig. 11 is a transverse sectional detail view on a larger scale taken along line 11—11 of Fig. 10;

Fig. 12 is a view similar to Fig. 11 taken along line 12—12 of Fig. 10;

Fig. 13 is a transverse sectional view on a larger scale taken along line 13—13 of Fig. 3;

Fig. 14 is a transverse sectional view on a larger scale taken along line 14—14 of Fig. 10;

Fig. 15 is a fragmentary detail view taken along line 15—15 of Fig. 14;

Fig. 16 is a fragmentary transverse sectional view taken along line 16—16 of Fig. 10;

Fig. 17 is a transverse sectional view taken along line 17—17 of Fig. 19;

Fig. 18 is a perspective view on a larger scale of the lock pin release mechanism;

Fig. 19 is a fragmentary plan view on a larger scale taken along line 19—19 of Fig. 10;

Fig. 20 is a sectional detail view on a larger scale taken along line 20—20 of Fig. 16;

Fig. 21 is a longitudinal sectional view taken along line 21—21 of Fig. 3;

Fig. 22 is a perspective view on a larger scale with parts broken away of a coupling member;

Fig. 23 is a longitudinal sectional view on a larger scale, with parts broken away, taken along line 23—23 of Fig. 5;

Fig. 24 is a transverse sectional view taken along line 24—24 of Fig. 23;

Fig. 25 is a sectional view taken along line 25—25 of Fig. 24;

Fig. 26 is a sectional detail view on a larger scale taken along line 26—26 of Fig. 34;

Fig. 27 is a view similar to Fig. 26 taken along line 27—27 of Fig. 34;

Fig. 28 is a perspective view of the blower motor mount and coupling;

Fig. 29 is a perspective view of the blower motor;

Fig. 30 is a perspective view of the bag holder;

Fig. 31 is a sectional view taken along line 31—31 of Fig. 30;

Figure 1:
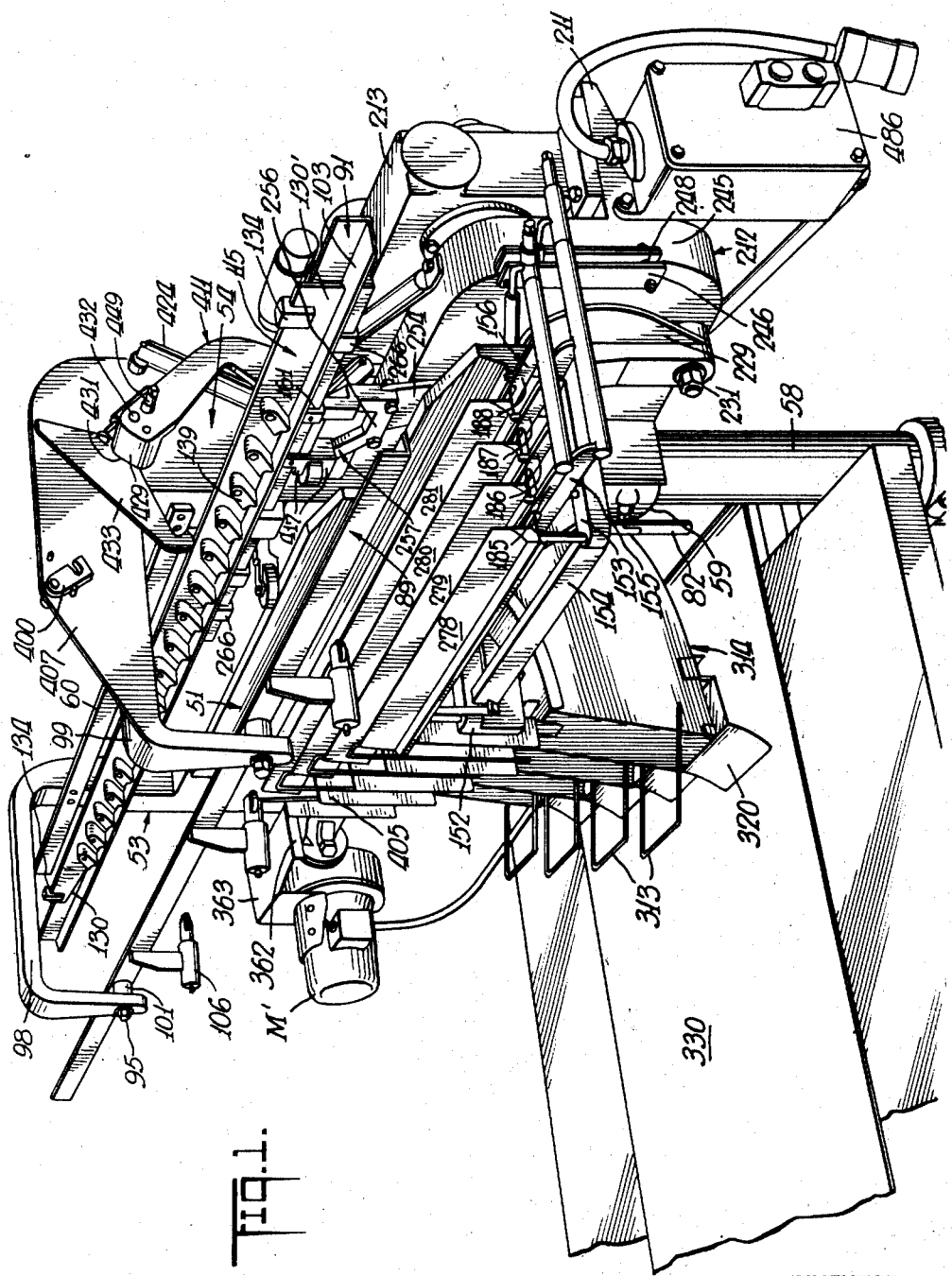
Fig. 1 is a perspective view of the bagging machine with parts broken away.

Figs. 32a, b, c and d are perspective views of the confection guide rails;

Fig. 33 is a perspective view of the pusher bar;

Fig. 34 is a perspective view of the confection rack;

Fig. 35 is a perspective view of the rack elevator;

Fig. 36 is a transverse sectional view taken along line 36—36 of Fig. 10;

Fig. 37 is a view similar to Fig. 36 taken along line 37—37 of Fig. 10;

Fig. 38 is a sectional view taken along line 38—38 of Fig. 35;

Fig. 39 is a transverse sectional view on a larger scale taken along line 39—39 of Fig. 10;

Fig. 40 is a perspective view on a larger scale of a portion of the confection guide rail;

Fig. 41 is a side elevational view showing another embodiment of the stick-holder opener;

Fig. 42 is a plan view taken along line 42—42 of Fig. 41;

Fig. 43 is a view similar to Fig. 41 of still another embodiment of the stick-holder opener; and Fig. 44 is a plan view taken along line 44—44 of Fig. 43.

In order that the construction of the bagging machine may be clearly understood, the general framework thereof will first be described and then under appropriate titles will be described the component structural parts of the preferred specific embodiment shown herein whereby automatic operation is achieved.

As shown in Figs. 1, 2 and 3, the machine desirably comprises a horizontal frame 51, preferably slidably mounted on the vertical portions of substantially L-shaped brackets 53 and 54, the upper ends of the vertical portions of which are joined together by a horizontal brace 60 to provide added strength. Each of the brackets has a semi-cylindrical portion 55, 56 respectively at the lower end thereof nesting against the upright standards 57 and 58 respectively, which support the machine and securely affixed thereto as by means of a clamp plate 59 affixed to portions 55, 56 as by bolts 61.

The frame 51 is desirably mounted so as to move vertically with respect to said vertical portions. For this purpose, as shown in Fig. 5, one end 62 of the frame on the rear face thereof has a vertical rearwardly projecting tenon 63 preferably formed integral therewith and riding in a recess 64 formed by the forwardly projecting portion 65 of a vertical guide member 66 affixed by transverse bolts 67 to the inner face 68 of the vertical portion of bracket 53.

Also formed integral with the frame 51 on the rear face thereof near the other end, is a second vertical rearwardly projecting tenon 71 riding in a recess 72 formed by the forwardly projecting portion 73 of a second vertical guide member 74 affixed by transverse bolts 75 to the inner face 76 of the vertical portion of bracket 54. To prevent transverse displacement of frame 51, tenon 63 and projecting portion 65 desirably are dovetailed, and tenon 71 and projecting portion 73 have coacting lips 77.

With the construction thus described, the frame may readily be vertically adjusted as by means of a vertical screw 79 threaded through a block 81 preferably formed integral with and extending laterally from clamp plate 59 of bracket 54. The lower end of the screw desirably has a handle 82 pivoted thereto as at 83 whereby upon rotation of said screw by said handle, the upper end of said screw will abut against the lower end of guide member 74 thereby to raise or lower the frame 51 as the case may be.

The machine herein described may be used with any of the conventional type of stickholders now on the market, such as for example (a) the type opened by lifting up a handle that extends longitudinally of the stick-holder (Fig. 16), (b) the type opened by pressing down on a handle that extends transversely of the stickholder (Fig. 41), or (c) the type opened by lifting up on a handle that extends transversely of the stick-holder (Fig. 43).

As such stick-holders per se form no part of this invention, they will not be described in detail but only insofar as is necessary for a clear understanding of the invention.

All of said stick-holders which will be referred to by the letter S are formed with rows of apertures 84 (Fig. 16), to receive sticks indicated at 85 with means being provided controlled by a handle 86 for releasably clamping the sticks.

*Stick-Holder support*

To support the stick-holder S so that it may automatically be opened and the stick-held confections C discharged therefrom, as shown in Figs. 1, 2, 13 and 16 of the drawings, a pair of spaced rails 89 and 91 are desirably provided on which the stick-holder may be slidably mounted.

The rails 89, 91, each of which desirably comprises a substantially L-shaped angle bar, are mounted in parallel horizontal relation near the upper ends of brackets 53 and 54. As is clearly shown in Fig. 2, rail 91 is affixed as at 92 to the vertical portions 93, 94 of brackets 53, 54 respectively, and rail 89 is affixed as at 95 to arms 96 and 97 depending from the horizontal cross pieces 98 and 99 of said brackets 53 and 54 respectively, a removable spacer collar 101 being provided between rail 89 and arms 96, 97 whereby the distance therebetween may be adjusted.

With the rails thus mounted, the horizontal portions 102 and 103 thereof will provide tracks for the laterally extending pins 104 (Fig. 13) rigidly affixed to the handles 105 of the stickholders S.

It is to be noted that by reason of the pins 104 the stick-holder S will ride on the tracks 102, 103 in horizontal position, being restrained from lateral displacement by a plurality of pusher devices 106, adapted to react against the side wall 107 of the stick-holder S to urge the latter toward rail 91.

As shown in Figs. 13 and 16, the pusher devices 106 each desirably comprises a spring-urged plunger 108 slidably mounted in a horizontal casing 109 affixed by means of a vertical arm 111 to the rail 89. The free end of plunger 108 desirably has a roller 112 thereon adapted to engage side wall 107 of the stick-holder S as the latter is advanced along tracks 102, 103 in the manner hereinafter to be described.

Stick-holder advancing mechanism

Although any suitable propelling mechanism could be used to advance the stick-holder S along the horizontal tracks 102, 103, in a preferred embodiment herein shown and described, the stick-holder is intermittently advanced along the tracks, desirably by a horizontal, reciprocable pusher bar 115. Bar 115 is desirably positioned so as to extend parallel to the vertical portion of one of the rails, illustratively the vertical portion 116 of rail 91 and is slidably mounted on the upper edge 117 of the said vertical portion 116 by means of a plurality of substantially L-shaped brackets 118 and 119 (Figs. 4 and 14). As shown in Fig. 4, the horizontal portion 121 of bracket 118 is affixed to the rear face of the pusher bar 115 as by rivets 122 and as shown in Figs. 14 and 15, the horizontal portion 123 of bracket 119 desirably has a shoulder portion 124 affixed against the rear face of the pusher bar 115 by rivets 125.

The under surface 126 and 127 of the horizontal portions 121 and 123 of brackets 118 and 119 respectively, rest on the edge 117 of rail 91 and the parts are so designed that the lower edge 128 of the pusher bar 115 will be slightly spaced from the track 103.

As shown in Figs. 4, 14 and 15, the brackets 118 and 119 each has a vertical portion 129 and 131 respectively, which extends below the upper edge 117 of rail 91 on the rear face thereof, thereby securely, yet slidably to mount the pusher bar on the rail.

It is to be noted that as the rail 91 is preferably of stainless steel, in order to avoid excessive wear due to friction which would occur if the brackets 118 and 119 were also of steel, they are desirably made of brass and the lower edge 128 of the bar 115 at the front end thereof is beveled as at 130 (Figs. 1, 33) to permit the removal of such bar in the manner hereinafter described.

In order both to space the pusher bar 115 from the vertical portion 116 of rail 91 and to prevent transverse movement thereof, a plurality of inverted substantially U-shaped guides 134 are provided. As is clearly shown in Fig. 12, the vertical portions 135 of the guides 134 are affixed to the inner face of the vertical portion 116 of rail 91 by bolts 136 with the depending finger 137 of the guide extending over the front face of the pusher bar. Thus, the bar is restrained between the vertical portion 135 and the finger 137 which are sufficiently spaced to provide slight clearance to permit free sliding of the bar.

To advance the stick-holder when the pusher bar is reciprocated in the manner hereinafter described, a plurality of pawls 139 are desirably equally spaced along the length thereof. As is shown in Fig. 11, the pawls 139 each comprise a dog, preferably of steel, pivotally mounted on a pivot 141 affixed on the front face of the bar 115.

In order to limit the movement of the pawls about their pivots 141, each pawl has a socket 142 in the inner face thereof adjacent bar 115 into which extends a stop pin 143 affixed to the bar and of smaller diameter than such socket, so that the pawl may move about its pivot a distance substantially equal to the diameter of the socket, less the diameter of pin 143. It is to be noted that the pins 143 are so positioned that the lower edge 144 of the pawl will be slightly spaced from the track 103 when the pawls are in their lowermost position.

Each of the pawls 139 at the free end thereof, desirably has an arcuate notch 145 therein which will be horizontally aligned with adjacent pins 104 on the stick-holder when the pawls are in their lowermost position, so that upon advance of the pusher bar, the notched end of the pawl will engage the associated pin to advance the stick-holder.

Confection conveyer mechanism

Means are provided, associated with the stick-holder supporting tracks 102, 103 to carry the lower end of the stick-held confections and to advance such confections in timed relation with the movement of the stick-holder on said tracks.

Such means desirably comprises a conveyer mounted on the horizontal frame 51 of the machine and desirably positioned beneath the tracks 102 and 103 and extending longitudinally thereof.

As shown in Fig. 2, the frame 51 near end 148 thereof has a pair of depending parallel spaced members 149 and 151 each of which has a forwardly extending arm 152 and 153 respectively, preferably formed integrally therewith, which arms are connected by a reinforcing bar 154 lying in a plane parallel to the frame 51.

Arms 152 and 153 which lie beneath rails 89 and 91, and extend transversely thereacross, mount the conveyer mechanism which, as shown in Fig. 3, desirably comprises an elevator 155 carrying a rack 156 vertically reciprocated by said elevator.

As shown in Fig. 35, the elevator 155 desirably comprises a pair of bars 157 and 158, parallel along the major part of their length with one of said bars, illustratively bar 157 desirably being bent inwardly as at 159 with the free end of said inwardly bent end affixed to the inner face 161 of bar 158. The spaced ends 162 and 163 of said bars have affixed thereto as by welding, a substantially cylindrical rod 164, end 165 of which extends beyond bar 158 and has a socket 166 therein (Fig. 38) in which is rotatably mounted the stud end 167 of a tubular member 168, said stud end being retained in said socket by a pin 169. As shown in Fig. 38, tubular member 168 has a ball seat 170 therein extending into a transverse bore 172 in such tube, a ball 171 being retained on said seat by a coil spring 173 compressed between said ball and the closed end of a sleeve 174 which is threaded into the bore of such tube as at 175.

Elevator 155, on each of the outer faces of the parallel portions of the bars 157, 158, on the bent portion 176 thereof and on the end of bar 158 has bushings 177 affixed thereto, said bushings each having a bore therethrough all inclined at the same angle and extending in parallel planes.

The elevator 155, by means of said bushings 177 may be slidably positioned on inclined pins 178 (Figs. 2 and 3) rigidly mounted on arms 152 and 153 of the frame and on an outwardly extending arm 179 also formed integrally with the frame.

As shown in Fig. 35, the elevator 155 desirably has a pair of transverse braces 181 and 182 affixed to their ends to the associated bars 157 and 158 and mounting a guide strip 183 therebetween, centrally positioned between bars 157 and 158 and extending parallel thereto. Each of the bars 157, 158 also has at the upper edge thereof, an inwardly extending flange 184 which slidably retains the rack 156 thereon when the device is assembled.

As shown in Fig. 34, the rack desirably comprises a plurality of equally spaced bars, illustratively four in number and designated by the numerals 185, 186, 187 and 188, which are retained in parallel relation by means of a plurality of transverse braces 189.

One of the braces 189 desirably has an elongated block 191 affixed to and extending along the underface thereof, said block 191 having a lip 192 at each end thereof adapted to fit respectively under the flanges 184 of the elevator as shown in Fig. 36.

To prevent pivoting of the rack with respect to the elevator, another of the braces 189 has a yoke member 193 affixed to the underface thereof and positioned so that the legs thereof straddle the central guide rail 183 of the elevator as shown in Fig. 37.

The bars of the rack 156, which are staggered in length with respect to each other, have a substantially cylindrical rod 194 affixed as by welding to their transversely aligned ends 195. As shown in Figures 26 and 34, the end 196 of rod 194 extends beyond bar 188 and has a socket 197 therein in which is rotatably mounted the stud end 198 of a substantially L-shaped member 199, said stud end being retained in said socket by a pin 201 (see Fig. 27). The portion 202 of member 199 extending at right angles to the stud end 198 is tubular and has a ball seat 203 therein extending into a transverse bore 204, a ball 205 being retained on said seat by a coil spring 206 compressed between said ball and the closed end 207 of a sleeve 208 threaded into the bore of portion 202 as at 209.

Means are provided to actuate the conveyer mechanism and the pusher bar 115 in timed relation so that both the rack 156 and the pusher bar 115 will be reciprocated at the same time and the rack 156 will be moved in substantially a rectangular path. Desirably such means comprises a motor M which, as shown in Fig. 5, is mounted to the rear of the frame 51 on a pair of spaced rearwardly projecting arms 211, rigid with and desirably formed integral with a housing 212 extending laterally from and desirably formed integrally with the lower end of the vertical portion of bracket 54. As is clearly shown in Figs. 5, 24 and 25, the motor M through reduction gear box 213 drives a shaft 214 extending into the housing 212, which shaft has a pinion 215 affixed thereon.

Pinion 215 meshes with a gear 216 rotatably mounted in said housing on a stud 217 affixed in the rear wall 218 of the housing as by a nut 219. Gear 216 desirably has a pair of pins 221 and 222 rigid therewith and extending transversely therefrom. The head 223 of the pin 221 extends into an enlarged opening 224 in a rocker plate 225 pivotally mounted on the housing 212 at the lower edge thereof as by a stud 226. As shown in Figs. 24 and 25, the head 223 of pin 221 rides on the inner periphery or cam surface of the opening 224 in rocker plate 225 which is so conformed that upon rotation of gear 216 the circular path of movement of the head 223 of pin 221 will cause the rocker plate 225 to oscillate back and forth. Pin 222 which extends through opening 224 in rocker plate 225 has its head 227 positioned in a groove 228 formed in the inner face of a second rocker plate 229, which is also pivoted to the lower portion of the housing on the same stud 226 that mounts rocker plate 225, the rocker plates being retained on said housing by means of nuts 231 threaded on the ends of stud 226.

Thus, the circular path of movement of pin 222 will cause the head 227 thereof to ride up and down in the groove 228 and hence oscillate rocker plate 229 back and forth.

The rocker plates 225 and 229 which actuate the elevator 155 and rack 156 respectively, are operatively connected thereto by suitable linkage. Such linkage, as shown in Figs. 5, 23, 38, 39 and 40, desirably comprises a pair of connecting rods 233 and 234 pivotally mounted at one end as at 235 and 236 to the upper portion of rocker plates 225 and 229 respectively. Each of the connecting rods has a substantially L-shaped link 237 and 238 respectively threaded at one end into a suitable opening in the free ends 239 of the rods. With the vertical portions 241 of the links 237 and 238 positioned in the transverse bores 172, 204 of members 168 and 199, they are securely yet removably retained in said bores by the coaction of the spring-urged balls 171 and 205 with the annular grooves 242 in the periphery of the vertical portions of said links.

Means are desirably provided to guide connector rod 233 to prevent lateral displacement thereof. To this end an angle iron 243 (Fig. 5) is affixed by screws 244 to the end wall 245 of the housing 212 to be retained in vertical position. A pair of flat plates 246 are affixed to angle iron 243 by nuts and bolts 247 and spaced from each other by spacers 248 to straddle connector rod 233.

As is shown in Figs. 23 and 24, rocker plate 229 at the upper edge thereof has a pin 251 rigidly mounted in a pair of upstanding flanges 252, which pin is straddled by the notched end 253 of a connecting plate 254. As shown in Figs. 1 and 10, the upper edge of plate 254 is affixed as by nuts and bolts 255 to the cross-piece 256 of a substantially yoke-shaped link 257, the upper ends of the legs 258 and 259, which have openings 261 therethrough, preferably square as shown, through which extends a horizontal actuating bar 262 secured to said yoke as by set screws 263.

As shown in Figs. 1, 10 and 11, actuating bar 262 is slidably mounted beneath the track 103 of rail 91 in bearing openings 264 in the horizontal portion 265 of bearings mounts 266, the vertical portions 267 of which are affixed to the outer face of the vertical portion 116 of the rail as at 268.

As shown in Figs. 10, 14 and 15, actuating bar 262 is operatively connected to pusher bar 115 by a pin 269 which extends through a bore 271 in the vertical portion 131 of bracket 119. The lower end 272 of the pin extends into the vertical bore 273 of a block 274 which has a horizontal bore 275 through which the actuating bar 262 extends, the block 274 being affixed to the actuating bar as by set screw 276.

Confection guides

In order to guide the confections as they are advanced in the manner hereinafter described, a plurality of guide rails are desirably provided, illustratively four in number designated by the numerals 278, 279, 281 and 282 respectively.

Although the guide rails could be of any suitable construction, as shown in Figs. 13 and 32, they desirably are of stainless steel stock substantially triangular in cross-section.

The rails, as shown in Fig. 32, are of unequal length, and have pairs of equally spaced mounting pins 283 and 284 affixed to the base 285 thereof and depending therefrom. In addition to mounting pins 283 and 284 guide rails 281 and 282 also have an additional mounting pin 285' and 286 respectively, affixed to their respective bases near the ends thereof.

Each of the mounting pins has a reduced nose end 287 forming a shoulder 288, whereby when said nose ends 287 are inserted into the openings 289 in arms 152, 153, and brackets 179 and 291, the latter also outwardly extending from the frame 51 (Fig. 1), as limited by the shoulders 288, the guide rails will be retained in spaced parallel horizontal position at a desired height above arms 152, 153, extending longitudinally of frame 51.

Means are provided securely yet removably to retain the guide rails on arms 152 and 153. Such means may comprise a latch 292 of resilient metal also affixed to the base 285 of the guide rails and depending therefrom. Each of the latches has a hook end 293 adapted to snap under and engage a transverse rod 294 (Fig. 2) mounted at one end on reinforcing bar 154 and at the other end on the lower portion of bracket 54.

The guide rails are so positioned that as shown in Figs. 1 and 5, the longest guide rail 282 is associated with the longest bar 188 and the shortest guide rail 278 is associated with the shortest bar 185 with opposed faces of pairs of said rails straddling bars 185 to 187 respectively of the rack, and with bar 188 of the rack straddled by face 295 of guide rail 282 and a longitudinal shoulder 296 desirably formed integral with frame 51.

The face 295 of guide rail 282 which is associated with bar 188 has a laterally extending flange portion 298 (Fig. 5) rigid therewith which is substantially equal in length to shoulder 296. The other face 299 (Figs. 5, 32) of rail 282 has a laterally extending flange portion 301 rigid therewith which is substantially equal in length to a laterally extending portion 302 on face 303 of guide rail 281. The other face 304 of guide rail 281 has a laterally extending portion 305 rigid therewith which is substantially equal in length to a laterally extending portion 306 on face 307 of guide rail 279. The other face 308 of guide rail 279 has a laterally extending portion 309 rigid therewith which is substantially equal in length to the laterally extending portion 311 of face 312 of guide rail 278.

With the construction thus described, the laterally extending portions and the shoulder 296 will provide pairs of tracks, each pair of equal length respectively, upon which the bottom surface of the confection may rest as shown in dot and dash lines in Fig. 13, said rails and said shoulder 296 being so spaced that the top of said bars 185 to 188 and the spaced fingers 297 thereon may be raised therebetween by the elevator 155 in the manner hereinafter to be described.

Thus, as the confections are moved along the tracks therefor and reach the ends thereof, they will be free to move horizontally therefrom to fall vertically into the bags carried in suitable hoppers which will now be described.

*Bag holders*

As shown in Figs. 30 and 31, the bag holder desirably comprises a substantially arcuate hopper 314 preferably of stainless steel, open at the inlet end 315 and the outlet end 316 thereof. The bottom of the hopper has a pair of flanges 317 extending laterally inward from the side walls 318 of the hopper respectively and on which the lower lateral edge 319 of the bags B will rest.

The front portion 321 of each of said flanges 317 is of reduced width and extends in a straight rather than an arcuate line as at 322, as does the lower edge of the side walls 318 associated with the front portion 321, and a stop member 323 is affixed to the outlet 316 of the hopper at the forward end of said flanges to retain the lateral corners 319 of the lower edges of the bags.

In order to mount the bag holder 314 to the frame 51, a plurality of bag holder supports (Fig. 2), illustratively four in number, designated by the numerals 324, 325, 326 and 327, are provided desirably integral with the frame 51 and positioned between end 62 thereof and arm 152 thereof, the supports preferably being equally spaced on such frame and depending therefrom. The supports are in stepped relation with support 324 which is adjacent arm 152 extending further outward from the frame 51 than support 327 which is adjacent the end 62 of said frame. As shown in Fig. 13, each of said supports has an inclined rear wall 328 which mounts a bag holder bracket 329 by means of screws 331 which extend through the cross-piece 332 of the bracket into rear wall 328.

The ends of the depending legs 333, 334 of the brackets are rearwardly bent at substantially right angles and are adapted to extend under the hooks 335 (Fig. 30) desirably struck out from the top wall 336 of the hopper securely yet detachably to mount the hopper 314.

The hopper is so positioned as shown in Fig. 13 that the bags B at the outlet end 316 thereof will be in substantially a vertical position. In addition to the stops 323 which restrain the lower lateral edges 319 of the bags B, means are provided to restrain the upper edges of the bags. Such means desirably comprises a finger 337 (Fig. 13) adapted to engage the protruding upper portion 338 of the rear wall 339 of the bag B, said finger having a bent end 341 whereby it may be affixed by screws 342 to the leg 333 of bracket 329. Desirably, leg 341 has a plurality of vertical slots 343 therein through which the shank of screw 342 extends to permit vertical adjustment of the finger.

*Blower mechanism*

In order to open the paper bags B supported in the bag holders, so that they may receive the stick-held confection, a blower mechanism is provided.

As shown in Figs. 3 and 28 the mechanism desirably comprises a motor mount 344 which may comprise a plate 345 having a plurality of vertical slots 346 therethrough each with an enlarged opening 347 at the bottom thereof of larger diameter than the heads of studs 348 (Fig. 2) which extend laterally outward from the face 349 of end 62 of the frame. Thus, when the plate 345 is positioned against face 349 with the heads of studs 348 extending through enlarged openings 347 and the plate is thereupon moved downwardly, the motor mount will be securely yet removably retained against the frame.

The bottom portion of mount 344 has a chamber 351 (Figs. 21, 28) formed integrally therewith, desirably having a substantially frusto conical inlet connector 352 and a substantially rectangular outlet 353.

The blower motor M' as shown in Fig. 29 is affixed as by screws 354 to a supporting bracket 355, and desirably has an outlet 356 with a locking conformation 357 (Fig. 27) which coacts with a corresponding locking conformation 358 on a connector 359, whereby the latter may be securely yet removably retained on said outlet 356.

As shown in Fig. 21, the connector 359 desirably has a substantially frusto conical bore 361 which will coact with the frusto conical inlet 352 of chamber 351. Thus, a substantially air-tight seal will be made when the motor assembly is mounted on the motor mount 344 as shown in Fig. 3, by means of the hook end 362 of the horizontal portion 363 of the bracket 355 which coacts with the upstanding flange 364 of the mount 344, the weight of the motor pivoting on flange 364 securely retaining connector 359 in inlet 352.

To provide a path for the flow of air from the blower motor M' to the bags, a conduit 365 is provided, which as shown in Figs. 7 and 13, desirably comprises a substantially channel-shaped member 366 preferably cast from aluminum and desirably having a groove 367 in the opposed inner faces of the side walls 368 thereof into which a rear plate 369 may be slid to form a closed conduit.

As shown in Figs. 5, 6 and 7, the closed far end 371 of the conduit has a forwardly projecting lip portion 372 adapted to be inserted in a corresponding recess 373 in the side wall 374 of arm 152. The inlet end of the conduit has an oblique portion 375 with a substantially rectangular opening 376 at the end thereof which may be aligned with outlet 353 of chamber 351 (Fig. 21).

When in this aligned position, the conduit 365 will be at an angle to the frame as shown in dashes in Fig. 5 and is securely retained in place by a dog 377 pivoted to the motor mount 344. Dog 377 when in locking position as shown in Fig. 21, coacts with the end 378 of the conduit to retain the shoulder 379 at the rear thereof against the rear edge of outlet opening 353.

As shown in Fig. 7, the conduit 365 on the front wall 381 thereof has a plurality of spaced faces 382 desirably formed integral with the wall 381 and at an angle with respect thereto, all of said faces lying in parallel planes. The angle of said faces 382 and the bent portion 375 of the conduit are so designed that with the conduit mounted at an angle on the frame as above described, the faces 382 will lie in planes parallel to the frame 51. As is clearly shown in Fig. 7, each of said faces 382 has a depending portion 383 with a recess 384 therein (Fig. 8) which has a slot 385 at the upper portion therein extending through said face and leading into the conduit 365, said depending portions 383 each having a pair of vertical guide bosses 387 desirably formed integral therewith and straddling the associated recessed portion 384.

A chute 388, shown in Figs. 9 and 13, is mounted on each of said faces 382 by means of a hook 389 affixed to the rear wall 391 thereof and engaging the upper edge 392 of the face 382 which desirably extends above the top wall 393 of the conduit 365.

The rear wall 391 of the chute 388 desirably has a pair of spaced slots 394 at the lower portion thereof through which the bosses 387 on the face 382 extend properly to position the chute. As is clearly shown in Fig. 13, the portion 395 of the rear wall 391 between the slots 394 covers the recess 384 in the face 382 with the lower edge 396 of said portion 395 aligned with the lower edge 397 of the depending portion 383 of said face, thereby to make an outlet nozzle 398 through which air from the conduit may be directed.

The chute 388 also includes a pair of side walls 399 and 401, one of which, i. e., wall 401, desirably has the leg 402 of a substantially U-shaped guide 403 affixed thereto, the depending leg 404 of said guide extending parallel to and spaced from rear wall 391.

With the construction thus far described, the mouths 405 of the chutes will be aligned with associated pairs of confection guide rails respectively as shown in Figs. 1 and 3, so that they are in position to receive the confections as they fall off the ends of the associated pair of guide rails, which confections will be guided by the chute into the bags carried in the hoppers associated with each of the pairs of laterally extending projections of the guide rails.

As a confection falls into the mouth of a bag and hits the bottom thereof, it will force the bag past flanges 321 whereupon the bagged confection will be guided by a guide lip 320 affixed to the bottom of the hopper onto a conveyer belt 330 (Figs. 1 and 3), which as it is conventional and per se, forms no part of this invention will not be further described. It is to be noted that a substantially U-shaped guide 313 is provided straddling each of the hoppers 314 and extending laterally therefrom to prevent the bagged confection from moving outwardly as it is discharged onto the conveyer belt, so that the confection will lie in substantially parallel rows thereon.

Before the confections can be discharged into the bags, they must be released from the stick-holders on which they are carried and to this end means are provided to open the stick-holders used with the machine.

The machine herein described which may be used with stick-holders such as (a) the type which are opened by lifting up a handle extending longitudinally of the stick-holder, (b) the type which are opened by pressing down on a handle that extends transversely of the stick-holders, or (c) the type which are opened by lifting up on a handle that extends transversely of the stick-holder, requires a different opening device for each of said types of stickholder.

In a preferred embodiment of the machine herein shown to illustrate the invention, the machine has incorporated therewith an opening device to be used with a stick-holder of type (a) that is opened by lifting up a longitudinally extending handle, which opener will now be described in detail.

*Opening device*

The opener device shown in Fig. 16 operates by having a portion thereof move transversely across the stick-holder to engage the handle 86 thereof and pull it in an arcuate path in a clockwise direction as shown to separate the closed jaws (not shown) of the stick-holders.

The opener desirably comprises a substantially L-shaped cam arm 411 pivotally mounted on transverse rod 412 which is affixed to the vertical portion of bracket 54. Rod 412 extends through a hub formation 413 at the lower end of the cam arm, the latter being laterally spaced from the vertical portion of the bracket 54 by the end 414 of the hub 413 adjacent said vertical portion. The hub 413 has a cam conformation 415 desirably formed integral therewith and adapted to lie in the path of a roller 416 rotatably mounted between the spaced horizontal fingers 417 (Figs.

1, 10) formed integrally with leg 259 of link 257. Pivotally connected as at 418 and 419 respectively to the side face of arm 411 adjacent bracket 54 are the ends of sleeves 421 and 422. Sleeves 421 and 422 are encompassed by sleeves 423 and 424 respectively, with the outer ends of said sleeves 423 and 424 being pivotally mounted as at 425 and 426 to the vertical portion of bracket 54, the bores of the associated pairs of sleeves 421, 423 and 422, 424 having tensed compression springs 427 and 428 therein respectively.

With the arrangement thus described, as shown in Fig. 16, spring 423 will normally bend to urge the cam arm 411 in a counterclockwise direction, the spring 428 which is under less tension than spring 423 aiding in such movement after the arm 411 has moved past rod 412.

The upper portion of cam arm 411 has a laterally extending hub 429 integral therewith (Figs. 1 and 16), having its inner face 431 slightly spaced from bracket 54 and to which is pivoted, as at 432, a latch 433 having a hook 433' at the free end thereof. Means are provided normally to retain the latch in its forwardmost position (Fig. 16) with the lower edge 434 thereof abutting against a stop pin 435 extending laterally from the inner face 431 of the hub 429. To this end a plunger 436 is slidably mounted in a tube 437 desirably formed integral with the cam arm 411, which plunger 436 is normally urged outwardly by means of a tensed coil spring 438 interposed between the closed end of tube 437 and the inner end of plunger 436, against a projecting lip 439 extending laterally from latch 433.

Means are provided to pivot latch 433 when the cam arm 411 is moved in counterclockwise direction. To this end as shown in Fig. 16, a latch pivoting member 400 is pivotally mounted as at 406 on upstanding flange 407 of the cross arm 99 of the bracket 54. Member 400 desirably comprises a substantially rectangular piece of metal, the pivotal movement of which is limited by a pair of spaced laterally extending pins 409 and 410 rigidly affixed to upstanding flange 407, the upper edge of said pivoted member desirably having an arcuate notch 400' therein to receive pin 410.

Means are provided to retain the opener arm 411 in retracted position as shown in Fig. 16. Such means, as shown in Fig. 20, desirably comprises a lock pin 441 slidably mounted in the reduced portion 442 of the bore 443 of a sleeve 444 affixed in a transverse bore 445 through the hub portion 429 of cam arm 411. Pin 441 has a head 446 adapted to seat on the shoulder 447 formed by such reduced portion and is normally retained on said shoulder by a tensed coil spring 448 positioned in sleeve 444, seated at one end against head 446 and normally retained in said sleeve by means of a plug 449 threaded as at 451 into the open protruding end 452 of the sleeve. Thus, as shown in Fig. 20, the nose 453 of pin 441 will normally be positioned in the bore of a bushing 454 affixed in a transverse bore 455 extending through the bracket 54, thereby locking the cam arm 411 to the bracket 54. In order to retract pin 441 to remove the nose end 453 thereof from the bore of bushing 443 so that cam arm 411 may be actuated, a release pin 456 is provided slidably mounted in a bushing 457 also affixed in bore 455, which pin has a collar 458 affixed thereon to limit the movement of such pin. The collar 458 is so positioned that when it abuts against bushing 454, the nose end 459 of pin 456 which normally extends into the bore of bushing 454 will force pin 441 completely out of bushing 454 to unlock the cam arm 411 and when collar 458 is seated against bushing 457 the noses 453, 459 of both pins 441 and 456 will be positioned in bushing 454 as shown in Fig. 20.

In order to actuate release pin 456 to move lock pin 441 out of bushing 454 against the tension of coil spring 448, the lock pin release mechanism shown in Figs. 17, 18 and 19 is provided. This mechanism desirably comprises a tube 461 rotatably mounted on an upstanding pin 462 affixed at its lower end in guide member 74 as is clearly shown in Fig. 18. The upper end of the tube has a yoke 463 affixed thereon, the legs of which, as shown in Fig. 18, straddle the end 464 of a release arm 465 which is pivotally mounted between said legs on a pin 466. Release arm 465 is normally retained in horizontal position by means of a tensed coil spring 467 (Fig. 18) positioned in a socket 468 formed in the solid upper portion 469 of said tube, and compressed between the bottom of said socket 468 and the lower edge of said arm 465. As shown in Figs. 19 and 20, the nose end 471 of said arm is bent at right angles and the lower edge 472 of said arm from the nose thereof to the pivoted end is beveled to form a cam edge, the function of which will be hereinafter described.

To actuate the lock release mechanism (Fig. 19) an arm 473 is provided having a bore therethrough into which the lower end of tube 461 extends to mount the arm 473 idly thereon. Arm 473 has a yoke conformation 474 at the free end thereof between the legs of which a horizontal roller 475 is rotatably mounted as on a pin 476. Also mounted on tube 461 is a reaction member 477 which, as shown in Fig. 19, desirably comprises a split collar 478 encompassing tube 461 and rigidly clamped thereagainst by means of a screw 479 threaded through extensions 481 of said collar. Formed integrally with said collar is a lateral finger 482 against which abuts a plunger 483 (Fig. 17) slidably mounted in an oblique bore 484 formed in the bracket 54 which plunger is normally retained against finger 482 by means of a coil spring 485 positioned in said oblique bore.

To key arm 473 to tube 461 so as to rotate therewith, the reaction member 477 desirably has depending projections 486 preferably formed integral therewith which extend into associated notches 487 in arm 473, whereby the arm 473, the tube 461 and the reaction member 477 will move simultaneously.

*Assembly*

The bagging machine above described may readily be dissembled for cleaning and repair in but a few minutes without the need for any tools.

Although such disassembly may be performed in any one of several ways apparent to any skilled workman, the following procedure will be described by way of illustration.

The guide rails 278, 279, 281 and 282 may first be removed by disengaging the hook end 293 of latch arm 292 from transverse rod 294 and lifting the rails to remove the mounting pins from their respective sockets or openings 289 in arms 152, 153 and brackets 179 and 291.

With the conveyer mechanism exposed by the removal of the guide rails, the rack 156 may be removed by withdrawing the resiliently held end 241 of link 238 from bore 204 in member 199 and thereupon sliding the rack so that lips 192 of block 191 are moved clear of flanges 184 on elevator 155. The rack may thereupon be lifted off the elevator.

The elevator may then be removed by withdrawing the resiliently held end 241 of link 237 from bore 172 in member 168 and then sliding the elevator 155 forward so that the bushings 177 thereof will clear pins 178.

Having thus removed the conveyer mechanism, the chutes 388 may be removed by merely moving them vertically to disengage the hook 389 thereof from the upstanding flange 392 of faces 362 of the air conduit 365.

The air conduit 366 may then be removed by pivoting dog 377 so that it no longer abuts against the edge 378 thereof. By merely pulling the released end of the conduit laterally from the frame 51 the other end of the conduit will readily be disengaged from its retaining recess 373 in arm 152.

The blower motor assembly can readily be removed by merely disengaging hook 362 of bracket 355 from ledge 354 and pulling the mouth of coupling member 359 from the inlet 352 of chamber 351.

With the blower motor assembly removed, the motor mount 344 may be disengaged from face 349 of the frame 51 by merely sliding it up on studs 348 until the enlarged openings 347 are aligned with the heads of said studs and thereupon moving the mount laterally away from face 349.

At this time the bag holders 314 can be removed by merely moving the hopper backwards to disengage lips of arms 333, 334 from hooks 335 on the top 336 of the hopper.

To remove the pusher bar 115, it is a relatively simple matter to pull pin 269 from bores 271 and 273 in the vertical portion of bracket 119 and from connector block 274, so that the pusher bar will no longer be connected to actuating bar 262.

The pusher bar 115 is then moved forward from the position shown in Fig. 1 until the rear end 138' thereof is clear of the associated guide 134. The end 138' is then lifted upwardly until it is clear of said guide 134 and then the bar is moved rearwardly over said guide 134 until the beveled end 130 of the bar is moved clear of the other guide 134 asociated with end 130 at which time the bar 115 can be lifted from the machine. It is to be noted that the end 138 of the pusher bar 115 is not snubbed between the guide 134 associated therewith and the track 103 when end 138' is lifted by reason of the beveled lower edge of end 130.

The above described procedure is sufficient for normal cleaning of the machine as all the parts which may possibly contact the confection or which are not readily accessible for cleaning if mounted on the machine are removed.

As the machine may be reassembled by reversing the above procedure, such reassembly will not be described.

OPERATION

To operate the machine thus described, the start button on the control box 486 mounted on casing 212 is pressed which will energize the drive motor M and the blower motor M'.

Energization of motor M will, through gear reduction box 213 turn shaft 214 and pinion 215 thereon. This will rotate gear 216 causing the pins 221 and 222 carried thereby to move in circular paths. The head 227 of pin 222 will ride up and down in groove 228 in rocker plate 229 causing the latter to rock back and forth on its pivot 226.

Such rocking movement, through connection plate 254 and link 257 will reciprocate actuating rod 262 in its bearings 266 and this will in turn reciprocate pusher bar 115 connected to actuating rod 267 by connector pin 269 so that bar 115 will slide back and forth on the upper edge 117 of rail 91.

The movement of rocker plate 229 through connecting rod 234 and link 238 will also reciprocate rack 156 which will slide back and forth on elevator 155 by reason of sliding engagement of lips 192 of block 191 with flanges 184 of the elevator.

It is clear that as the pusher bar 115 and the rack 156 are both actuated by the rocker plate 229, they will both move the same distance.

Rotation of pin 221 in a circular path as above described, will cause the head 223 thereof to ride against the cam surface of opening 224 of rocker plate 225 causing the latter to rock back and forth on pivot 226. The movement of rocker plate 225 through connecting rod 233 and link 237 will reciprocate elevator 155 causing it to slide up and down in its bushings 177 on inclined pins 178, thereby lifting and lowering the rack 156 slidably mounted there on.

The movement of the rocker plates 225 and 229 are so timed that when the elevator 155 is sliding up and down on pins 178, the rack 156 is at rest and when the rack 156 is moving forward and backward, the elevator 155 is at rest. Thus a rectangular path of movement will be imparted to the rack.

The guide rails 278, 279, 281 and 282 are so spaced with respect to the rack 156 that when the rack is at its uppermost position the upper edge thereof and the teeth 297 thereon will extend above the laterally extending flanges of the associated pairs of rails and when at its lowermost position both the upper edge and the teeth of the rack will lie below the flanges as shown in Fig. 13.

It is to be noted, as shown in Figs. 5 and 32, that a tooth 297' is positioned at the end of each of the bars of the rack 156 adjacent the discharge end of the guide rails, and the bars are of such length that in their forward movement in which the teeth extend above the flanges, the tooth 297' will extend slightly beyond the discharge end of the guide rails.

After the machine is operating, as above described, the attendant need merely slide a stick-holder S carrying a batch of stick-held confections C, illustratively a stick-holder of the type having a longitudinally extending opening handle 96, onto tracks 102, 103 so that pins 104 of the stick-holder rest on such tracks.

In this position the pins on track 103 will be in the path of movement of the pawls 139 carried by the pusher bar 115. As the pusher bar 115 is advanced as above described, the notched end 145 of one of the pawls will engage a pin 104, and thereby advance the stick-holder along the track a distance equal to the forward stroke of the pusher bar 115. As the pusher bar is moved backwards, the stick-holder S will be at rest as the pawl 139 in advance of the one which previously engaged pin 104 will ratchet over such pin.

Continued reciprocation of the pusher bar 115 as above described, will cause the stick-holder S to be advanced in steps along tracks 102 and 103 with the confections C carried by the stick-holder S hanging down from the latter. Longitudinal rows of confections will ride between the associated faces of the guide rails with the bottom edges of the confections spaced only slightly from the flanges sufficiently so that they will be clear of the teeth 297 in the upward movement of the rack.

It is to be noted that such clearance may readily be adjusted depending upon the length of the confection, by merely turning screw 79 by its handle 82. This will raise or lower the frame 51 as the case may be and consequently vary the vertical position of the conveyer mechanism.

As the stick-holder S is further advanced along tracks 102, 103 as above described, the leading portion of the side wall 107 thereof will abut against roller 475 of the lock release mechanism. Continued movement of the stick-holder S against roller 475 will cause arm 473 to rotate tube 461 against the tension of coil spring 485 which urges plunger 483 against reaction finger 482.

Movement of tube 461 in a clockwise direction as shown in Fig. 19, will cause the back face of the nose end of arm 465 to move by and press against release pin 456 thereby moving the nose end 459 of the latter into bushing 454 and consequently forcing lock pin 441 out of said bushing against the tension of coil spring 448.

With lock pin 441 no longer in bushing 451, cam arm 411 will be released, to be pivoted in a counterclockwise direction as shown in Fig. 16, first by coil spring 427 alone and after the arm has pivoted to bring pivot point 419 past rod 412, also by coil spring 428.

As cam 411 is pivoted, the uper edge of latch 433 will abut against member 400 which is restrained by pin 409. This will cause latch 400 to pivot in a clockwise direction on pivot 432 against the tension of coil spring 438, to raise the hook end 433' of the latch over the longitudinal handle 86 of the stick-holder S. Continued movement of the cam arm 411 will move the upper edge of latch 433 past member 400 at which time the latch will be pivoted in a counterclockwise direction by spring-urged plunger 436 to bring hook 433' in position to engage handle 86 as shown in dot and dash lines in Fig. 16.

It is to be noted that at this time the pusher bar 115 has ceased its forward motion and is beginning to move backwards. Roller 416 carried by link 257 will ride against the cam conformation 415 of hub 413 thereby pivoting cam arm 411 in a clockwise direction as shown in Fig. 16. This movement of cam arm 411 will cause the hook 433' of latch 433 to pull up on the handle 86 of stick-holder S which is now at rest inasmuch as the pusher bar 115 is moving in a rearward direction.

As the back edge of the latch 433 abuts against member 400, the latter will pivot in a counterclockwise direction as shown in Fig. 16, and as sufficient clearance is afforded by the notch 400' which will be moved to straddle pin 410, the latch arm will be able to move past member 400.

Continued movement of the cam arm by roller 416 on link 257 will cause the handle 86 to be lifted until it opens the clamp jaws of the stick-holder S thereby releasing the upper ends of the sticks 85 held therein.

The released confection will thereupon drop in vertical direction until the bottom edges thereof rest on the flanges of the guide rails as shown in Fig. 13.

As the distance between the bottom edges of the confections and the flanges is only sufficient to provide clearance during the initial movement of the confections between the guide rails, there will be no danger of cracking of the confections or other injury thereto.

It is to be noticed as shown in Fig. 13, that even with the clamp jaws of the stick-holder S open and the confections resting on the flanges of the guide rails, the sticks 85 are of such length that the upper ends thereof will still be loosely held in the opened clamp jaws thereby retaining the confections in a substantially vertical position.

Further movement of the cam arm 411, will cause the hook end 433' of latch 433 to disengage handle 86 and as the lock pin 441 in the hub portion 429 of the cam arm 411 becomes aligned with the bore of bushing 454 in the bracket 54, the pin will snap therein thereby locking the cam arm 411 against further movement.

The next forward movement of the pusher bar 115 by the drive mechanism therefor above described, will cause the pawls 139 to engage pin 104 on the carrying handle of the opened stick-holder to again advance the latter.

Although roller 416 will again move by cam conformation 415 on hub 413 with each reciprocation of the pusher bar 115, as cam arm 411 is locked against the bracket 54, it will not be actuated and as roller 475 of the lock release mechanism is still engaged by the side wall 107 of the stick-holder S, the pivoted arm 465 will be in the position shown in full line in Fig. 19, thereby not engaging release pin 456.

As the pusher bar 115 starts its forward motion to again advance the previously opened stick-holder S, the rack 156, which has previously been lifted by the elevator, will simultaneously be advanced. Thus the confections which rest at their bottom edge on the bars 185 to 188 inclusive, and the upper ends of the sticks 85 which are loosely supported in the open jaws of the stick-holder, will be moved forward in substantially a vertical position without sliding which might scratch the bottom edge thereof.

After the pusher bar 115 and rack 156 have completed their forward motion, the elevator 155 will be lowered by the movement of rocker plate 229 and the rack will also be lowered gently, depositing the bottoms of the confections on the flanges with the upper ends of the sticks 85 still retained in the open jaws of the stick-holder.

To prevent the confections from sliding on the flanges as they are deposited thereon, the flanges desirably have a plurality of depressions 490 therein with which the bottoms of the confections will register. As such depressions 490 and the openings in the jaws of the stick-holders are substantially in vertical alignment, the confections will be retained in vertical position.

By reason of the upstanding teeth 297 on the respective bars of the rack 156, the bottoms of the confections in no event can be displaced sufficiently so that the upper ends of the sticks will come out of the open jaws of the stick-holders, and hence the confections will always be retained in substantially upright position during the course of their movement between the guide rails.

Continued reciprocation of the pusher bar and the rack will advance the confections to the ends of the associated pairs of guide rails. Referring to Fig. 5, as the lower end of the leading confection between guide rails 278, 279, for example, reaches the ends of the rails, it will still be supported in substantially vertical position. The next forward movement of the pusher bar 115 and the rack will cause tooth 297′ at the front end of bar 185 of the rack to press against the rear side edge of the leading confection and slide it along the flanges until such rear side edge is no longer supported by the flanges at which time the confection will drop into the associated chute 388.

As the upper end of the stick 85 is supported in the opened jaws of the stick-holder which is moved in timed relation with the rack and as the bottom of the confection will be supported on the flanges until it is pushed off the latter, the confection when it is dropped into the chute will be in vertical position.

As the confection drops into the chute, it will be retained therein by depending arm 404 and will be guided into the mouth of the frontmost bag B in the associated hopper, which bag mouth has been opened by the air jet from nozzle 398. As the center portion 395 of the chute is between the dropping confection and the air nozzle, the flow of air into the bag will not be cut off by the confection as it drops and hence the bag will remain open to receive the confection. When the confection reaches the bottom of the bag, the weight thereof will pull the lateral edges thereof off flanges 321 of the hopper 314 and as the confection is of smaller width than the distance between such flanges 321, the bag with the confection therein will drop therebetween and be guided by deflector lip 320 onto conveyor 330 which will carry the bagged confections away from the machine.

The operation above described will be repeated as the stick-holder and confections are advanced until all of the confections have been dropped into the chutes aligned with the associated pair of guide rails, and bagged as above described.

In the event that an "umbrella" of frozen ice cream should join the confections together, it is apparent that the machine will not jam, for the confections would merely not drop into the chutes and would be carried along by the movement of the rack. These confections would drop on the conveyor due to melting of the "umbrella" and then could be bagged manually by the operator, or the operator could break off the confections carried by the "umbrella" and bag them.

After the stick-holder had been advanced so that all the confections have been discharged therefrom, it would be further advanced by the pusher bar to the end of tracks 102, 103 at which time the empty stick-holder could be removed from the machine.

When the side wall 107 of the stick-holder moved past roller 475, the tube 461 would be free to pivot in a counterclockwise direction as shown in Fig. 19 under the urging of spring 485 against reaction arm 482. As the nose end of arm 465 moved past release pin 456, the beveled under edge 472 of arm 465 would ride over the pin 450 so that the latter would not be actuated.

The arm 465 would be restored to its normal position by spring 467 and the arm 473 carrying roller 475 would be in position ready to intercept the next stick-holder being advanced on the tracks.

With the locking mechanism above described, the cam arm 411 will only be actuated once for each stick-holder to be opened thereby and hence repeated oscillation of the cam arm which would otherwise result each time the roller 416 moved by cam conformation 415 is avoided.

The machine herein described may readily be modified for use with stick-holders of the type in which the release handle extends transversely thereof and which must be pushed down, or of the type in which the release handle must be lifted.

The machine when used with such stick-holders would not require the cam arm and associated lock release mechanism nor would it require the roller on link 257.

The opening devices used with stick-holders of the above types are shown in Figs. 41 to 44 inclusive. As such openers are identical in many respects, corresponding parts thereof will be given the same reference numerals.

Each of the opening devices comprises a rod 491 extending transversely across the rails 89 and 91 near the inlet ends thereof, and supported at each end on upstanding brackets 492, 493 affixed to the inner face of the vertical portion of each of said rails respectively by screws 494. A hub 495 is idly mounted on rod 491 and by means of sleeves 496 and 497 encompassing said rod, the hub is retained in fixed position on said rod between said brackets 492, 493.

Means are provided normally to urge said hub in a counterclockwise direction as shown in Figs. 41 and 43. Such means desirably comprises a tensed coil spring 498 encompassing rod 491 between hub 495 and bracket 492 with the ends of said spring fixed to said hub and said bracket respectively.

Each of the hubs 495 has a depending portion 499, desirably formed integrally therewith and preferably having a bore 501 therethrough through which a handle opening or tripper arm 502 may be inserted to extend longitudinally of the stick-holder. The depending portion 499 of the hub desirably has a split therethrough leading into said bore 501 and by means of a nut and bolt 503 extending through a transverse opening in said depending portion 499, the arm 502 may be clamped in any position of adjustment in bore 501.

To limit the rotation of said hub 495 on rod 491 under the urging of tensed coil spring 498, a stop is provided which desirably comprises a screw 504 threaded through the cross bar 505 of a substantially U-shaped bracket 506 extending transversely across the stick-holder and the legs 507 of which are affixed to brackets 492 and 493 respectively.

As shown in the drawings, the screw 504 is so positioned in the cross bar 505 that the end of the screw will be in the path of movement of the tripper arm 502 thereby adjustably limiting the movement of the latter.

The tripper arm 502 of the opening device shown in Figs. 41 and 42 which is for use with the stick-holder of the type requiring the handle thereof to be pushed downwardly to open, desirably has a bifurcated finger 508 at the lower end thereof adapted to engage the handle 509 of the stick-holder to lower such handle to open the clamp jaws of the stick-holder, in the manner hereinafter to be described.

The tripper arm 502 of the opening device shown in Figs. 43 and 44 which is for use with the stick-holder of the type requiring the handle thereof to be lifted to open, desirably has a curved end portion 511 with a laterally extending finger 512, which finger and curved portion will lift the handle 513 of the stick-holder to open the clamp jaws of the latter in the manner hereinafter to be described.

As the stick-holder shown in Figs. 41 and 42 is advanced by the pusher bar 115 as previously described, the bifurcated finger 508 will be engaged by the handle 509. Continued advance of the stick-holder will cause the tripper arm 502 to be pivoted in a clockwise direction as shown in Fig. 41 while at the same time depressing the handle 509 to open the jaws of the stick-holder.

When the stick-holder has been advanced so that the handle 509 is in the position shown in dot and dash lines in Fig. 41, the handle 509 will be moved away from the bifurcated finger 508 which will then abut against the conveyer handle 511 of the stick-holder, further to pivot the tripper arm. When the stick-holder has been moved sufficiently so that the carrying handle 511 moves past bifurcated finger 508 the tripper arm will be rotated by tensed coil spring 498 back to its original position against screw 504 ready for the next stick-holder.

In order to prevent vertical displacement of the stick-holder as it is advanced along tracks 89 and 91 which may cause the bifurcated finger 508 not to be aligned with handle 509 and hence not depress the latter, a longitudinally extending bar 514 is provided mounted on the cross pieces 98, 99 of brackets 53, 54, respectively, and movable vertically with respect thereto, the bars 514 being normally urged downwardly by springs 516. The bar 514 will press down on the leading carrying handle (not shown) which will pass under the upwardly bent front end 513 of the bar 514.

As the stickholder shown in Figs. 43 and 44 is advanced by the pusher bar 115, the finger 512 will pass between carrying handle 516 and the side wall 517 of handle 513. Further advance of the stick-holder will cause the carrying handle 516 to abut against the curved portion 511 of tripper arm 502, thereby pivoting the latter in a clockwise direction. This will cause the finger 512 thereof to push upwardly against side wall of handle 513 thereby lifting such handle to open the stick-holder. Continued movement of the stick-holder will cause the carrying handle 516 to move past the tripper arm which will thereupon pivot back to its original position under the urging of coil spring 498.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. An automatic bagging machine of the type using a stick-holder for suspending stick-held confections, such stick-holder having a longitudinally extending handle operated by lifting up thereon to open such stick-holder, said machine comprising means for supporting such stick-holder in horizontal position, means for advancing such stick-holder along said horizontal supporting means, means actuated in timed relation with such stick-holder advancing means, movable transversely across such stick-holder to lift up such handle to open such stick-holder to release the ends of such sticks thereby dropping such confections, means associated with such stick-holder to retain such released confections in substantially vertical position after they have been dropped with the released upper ends of such sticks still in such stick-holder, a hopper for bags associated with said last-named means, and means associated with said last-named means to drop such released confections vertically into the bags in said hopper.

2. An automatic bagging machine of the type using a stickholder for suspending the confections, said stickholder having a transverse handle for releasing the sticks therefrom which operates by pressing down thereon, said machine comprising means for supporting said stickholder in a horizontal position, means for advancing said stickholder along said supporting means, means including a pivotal tripper arm extending longitudinally of said supporting means adapted to be actuated by movement of said stickholder along said supporting means to press down on said handle to release the sticks thereby dropping said confections, said tripper arm having a bifurcated finger at one end, means for retaining said finger in the path of movement of the release handle of said stickholder whereby upon movement of said stickholder said finger will engage said release handle and force the latter downwardly to open the same, means for returning said finger to its original position when it is no longer engaged by said handle, means associated with said stickholder to direct the released confections in a vertical position into bags, and a hopper for bags associated with said vertical retaining means.

3. An automatic bagging machine of the type using a stick-holder for suspending stick-held confections, such stick-holder having a transverse handle thereacross operated by lifting up thereon to open such stick-holder to release the ends of such sticks, means for supporting such stick-holder in horizontal position, means for advancing such stickholder along said horizontal supporting means, means actuated by the movement of such stick-holder along said supporting means to lift up on such handle to open such stick-holder to release the ends of such sticks thereby dropping such confections, means associated with such stick-holder to retain such released confections in substantially vertical position after they have been dropped with the released upper ends of such sticks still in such stick-holder, a hopper for bags associated with said last named means, and means associated with said last named means to drop such released confections vertically into the bags in said hopper.

4. The combination set forth in claim 3 in which the means to open such stick-holder comprises a tripper arm extending longitudinally of said supporting means, said tripper arm having a downwardly curved portion with a lateral extending finger at the end thereof, means to retain said curved portion in the path of movement of the stick-holder carrying handle, and said finger aligned with the side wall of the stick-holder opener handle so that it may engage the latter, means pivotally mounting said tripper arm on an axis extending transversely across said supporting means, whereby upon movement of such stick-holder on said supporting means said carrying handle will abut against said curved portion to move said finger against said side wall to lift up on said opener handle to open the stick-holder and said tripper arm will be pivoted on its axis, and means to pivot said tripper arm to its original position when said finger is no longer engaged by said side wall.

5. An automatic bagging machine of the type using a stick-holder for suspending stick-held confection, such stick-holder having laterally extending pins, said machine comprising a pair of spaced parallel horizontal tracks on which such pins may rest to support such stick-holder, a reciprocable pusher bar associated with one of said tracks and having a plurality of spaced pivoted pawls associated with the pins riding on said last named track and adapted to engage such pins to advance such stick-holder when said pusher bar is moved in one direction and to ratchet over such pins when said pusher bar is moved in the opposite direction, means for opening such stick-holder to release the ends of such sticks thereby dropping such confections, means associated with such stick-holder to retain such released confections in substantially vertical position after they have been dropped with the released upper ends of such sticks still in such stickholder, a hopper for bags associated with said last named means, and means associated with said last named means to drop such released confections vertically into the bags in said hopper.

6. The combination set forth in claim 5 in which means are provided coacting with such stick-holder to urge the latter laterally towards the track mounting said pusher bar.

7. The combination set forth in claim 6 in which said means comprises a plunger, means on the other of said tracks slidably mounting said plunger, resilient means normally urging said plunger toward the track mounting said pusher bar and a roller on the end of said plunger adapted to engage the adjacent side wall of such stick-holder.

8. The combination set forth in claim 5 in which a horizontal actuating bar is slidably mounted beneath the track associated with said pusher bar and means are provided connecting said actuating bar and said pusher bar.

9. The combination set forth in claim 5 in which said track associated with said pusher bar has an upstanding wall and said pusher bar has guide means affixed thereto and slidably mounted on said upstanding wall.

10. The combination set forth in claim 9 in which said guide means rests on the upper edge of said upstanding wall.

11. The combination set forth in claim 5 in which a horizontal actuating bar is slidably mounted beneath the track associated with said pusher bar, said track has an upstanding wall and said pusher bar has guide means affixed thereto and resting on the upper edge of said wall slidably to mount said pusher bar on one side of said wall, one of said guide means having a vertical portion on the other side of said wall and said actuating bar has a connecting block affixed thereto, and a pin extends through a bore in said vertical portion and said block releasably to connect the two.

12. The combination set forth in claim 11 in which said upstanding wall has two retaining brackets affixed thereon, said brackets each having a finger extending over said pusher bar and preventing transverse displacement thereof, said pusher bar at one end thereof adjacent one of said brackets having a beveled lower edge, whereby upon removal of said connecting pin and sliding of said bar on said track until the other end of the bar is clear of its associated finger, said last named end may be lifted to clear said last named bracket and be moved over said last named bracket clear of said first named bracket.

13. An automatic bagging machine of the type using a stickholder for suspending stickheld confections in longitudinal rows, said machine comprising means for supporting said stickholder, means for advancing said stickholder along said supporting means, means for opening said stickholder to release the ends of such sticks thereby dropping such confections, a plurality of spaced parallel horizontal guide means defining a plurality of open channels extending longitudinally below said stickholder and below said supporting means and being aligned respectively with the longitudinal rows of confections, said guide means having opposing spaced conformations extending laterally into said open channels to limit the dropping motion of such confections so as to retain the released upper ends of such sticks still in said stickholder thereby retaining the confections in substantially vertical position, a bag hopper associated with each of said channels and means associated with said channels to move such released confections therefrom to drop vertically into such bags.

14. The combination set forth in claim 13 in which each of said guide means comprises a rail having means for detachably mounting the same on said machine, said means comprising a plurality of spaced horizontal arms extending at right angles to said rails, said arms each having a plurality of vertical bores therein, said rails each having pins depending therefrom and coacting with said bores to retain said rails in horizontal position, a rod associated with said arm and extending parallel thereto and a latch member on each of said rails depending therefrom and releasably engaging said rod.

15. The combination set forth in claim 13 in which the laterally extending conformations of each of said guide means have a plurality of spaced transverse aligned depressions therein to provide a seat for the bottom of such confections.

16. The combination set forth in claim 13 in which said last named means comprise a rack having a plurality of spaced parallel bars normally positioned beneath said channels, and extending longitudinally thereof respectively between the spaced laterally extending conformation thereof, means to raise and lower said rack to raise the upper surface of said bars above said conformations to lift such confections and means to advance said rack when it is raised and to retract said rack when it is lowered, thereby moving such confections along said guide means, said bars having means at the ends thereof to push such confections off the end of said channels whereby they will drop vertically into such bags.

17. The combination set forth in claim 16 in which said bars each has a plurality of spaced upstanding teeth on the upper surface thereof, of such height that the upper ends of said teeth are below said laterally extending conformations when the rack is lowered and the means at the ends of the bars to push such confections comprises one of said teeth.

18. An automatic bagging machine of the type using a stickholder for suspending stickheld confections in longitudinal rows, said machine comprising means for supporting such stickholder, means for advancing such stickholder along said supporting means, means for opening said stickholder to release the ends of such sticks thereby dropping such confections, a plurality of spaced parallel guide means defining a plurality of channels extending longitudinally of such stickholder, and positioned beneath said supporting means, said channels being associated respectively with the longitudinal rows of confections, said channels having laterally extending spaced conformations to limit the dropping motion of such confections so as to retain the released upper ends of such sticks still in such stickholder thereby retaining the confections in substantially vertical position, a bag hopper associated with each of said channels, longitudinally extending means in each of said channels positioned between the spaced laterally extending conformations therein, means to raise and lower said longitudinally extending means to lift such confections off said laterally extending conformations, and deposit such confections back onto said laterally extending conformations, and means to move said longitudinally extending means when the latter is lifted to advance the confections in said channels, said longitudinally extending means having means to push such confections off the end of said channel to drop vertically into such bags.

19. An automatic bagging machine of the type using a stickholder for suspending stickheld confections in longitudinal rows, said machine comprising a pair of spaced parallel horizontal tracks for supporting such stickholder, reciprocable means for intermittently advancing such stickholder along said tracks, means for opening such stickholder to release the ends of such sticks thereby dropping such confections, a plurality of spaced parallel channels extending longitudinally of such stickholder and aligned with such longitudinal rows of confections, said channels having spaced laterally extending conformations to limit the dropping of such confections so as to retain the released upper ends of such sticks still in such stickholder, thereby retaining the confections in substantially vertical position, a hopper for bags associated with each of said channels, an elevator member positioned beneath said channels extending longitudinally thereof, a rack member slidably mounted on said elevator, said rack having a plurality of bars extending longitudinally of said channels respectively, means to raise said elevator to move the upper surface of said bar above said lateral conformations to lift such confections off said conformations and to lower such elevator to deposit such confections back onto said conformations, means to advance said rack in timed relation with the reciprocable stickholder advancing means when said elevator is raised, said bars having a pusher finger at the end thereof to move such confections off the ends of said conformations to drop vertically into such bags.

20. An automatic bagging machine of the type using a stickholder for suspending stickheld confections, such stickholder having a longitudinally extending handle operated by lifting up thereon to open such stickholder, said machine comprising means for supporting such stickholder in horizontal position, means for advancing such stickholder along said supporting means, an opener arm having a hook movable transversely across such stickholder, from a standby position to a handle engaging position, lock means in said standby position to restrain movement of said arm, means to release said lock means, means to move said opener arm hook transversely across such stickholder to handle engaging position when said lock means are released, means actuated in timed relation with the movement of such stickholder to move said opener arm to standby position thereby lifting up on such handle and opening such stickholder to release the ends of such sticks thereby dropping such confections.

21. The combination set forth in claim 20 in which means are provided associated with such stickholder supporting means to retain such released confections in substantially vertical position after they have been dropped with the released upper ends of such sticks still in such stickholder, a hopper for bags associated with said last named means, and chutes associated with said last named means to drop such released confections vertically into the bags in said hopper.

22. The combination set forth in claim 20 in which means are provided in spaced relation below said stickholder supporting means to retain said released confections in substantially vertical position after they have been dropped with the released upper ends of such sticks still in such stickholder, a hopper for bags is associated with said last named means, and chutes associated with said last named means to drop such released confections vertically into the bags in said hopper.

23. The combination set forth in claim 20 in which said opener arm is pivotally mounted at one end on an upstanding member and said lock means comprises a lock pin slidably mounted in said arm and resiliently urged into a bore in said upstanding member to lock the opener arm.

24. The combination set forth in claim 23 in which the means to release said lock means comprises a release pin slidably mounted in the bore of said upstanding member with one end of said pin abutting against the adjacent end of said lock pin and with the other end of said release pin extending from said bore, means being provided to move said release pin into said bore to force said lock pin out of said bore thereby to release said opener arm.

25. The combination set forth in claim 24 in which means are provided to pivot said latch to move the hook end thereof over such stickholder handle when said opener arm is pivoted.

26. An automatic bagging machine of the type using a stickholder for suspending stickheld confections, such stickholder having a longitudinally extending handle operated by lifting up thereon to open such stickholder, said machine comprising means for supporting such stickholder in horizontal position, means for advancing such stickholder along said supporting means, an opener arm pivotally mounted at one end to move in an arc at right angles to said supporting means from a standby position to a handle engaging position, a latch pivotally mounted at the other end of said arm and having a hook thereon movable transversely across said supporting means, lock means in said standby position to restrain movement of said arm, means actuated by the movement of such stickholder to release said lock means, means to pivot said arm to move said hook to handle engaging position when said lock means are released, means actuated in timed relation with the stickholder advancing means to move said opener arm back to standby position thereby lifting up on such handle and opening such stickholder to release the ends of such sticks thereby dropping such confections.

27. An automatic bagging machine of the type using a stickholder for suspending stickheld confections, such stickholder having a longitudinally extending handle operated by lifting up thereon to open such stickholder, said machine comprising means for supporting such stickholder in horizontal position, means for intermittently advancing such stickholder along said supporting means, an upstanding member, an opener arm pivotally mounted at one end on said member and having a hook movable transversely across such stickholder from a standby position to a handle engaging position, a lock pin slidably mounted on said arm and resiliently urged into a bore in said upstanding member to restrain movement of said arm when the latter is in standby position, a release pin slidably mounted in said bore of said upstanding member with one end of said pin abutting against the adjacent end of said lock pin and with the other end of said release pin protruding from said bore, means actuated by the movement of such stickholder to move said release pin into said bore to force said lock pin out of said bore thereby to release said opener arm to move said hook to handle engaging position, means actuated in timed relation with the movement of such stickholder to move said opener arm to standby position thereby lifting up on such handle and opening such stickholders to release the ends of such sticks thereby dropping such confection.

28. The combination set forth in claim 27 in which said last named means comprises a pivotally mounted vertical member having a lateral arm in the path of movement of such stick holder and adapted to be engaged thereby to pivot said member, said member having a second lateral arm adapted to abut against the protruding end of said release pin when said vertical member is pivoted thereby to move said release pin into said bore.

29. The combination set forth in claim 27 in which means are provided to pivot said vertical member back to its original position and said second lateral arm is pivoted at one end on substantially a horizontal axis on said vertical member and conformed so that it will be carried over the protruding end of said release pin when said vertical member is pivoted back to its original position.

30. The combination set forth in claim 27 in which the means to move said opener arm to standby position comprises a cam conformation on the lower end of said arm and a roller movable across said cam in timed relation with the movement of said stickholder advancing means to pivot said arm to its standby position.

TAMIS C. SCHENK.

References Cited in the file of this patent

UNITED STATES PATENTS

| Number | Name | Date |
|---|---|---|
| 2,355,500 | Anderson | Aug. 8, 1944 |
| 2,528,997 | Blanchard | Nov. 7, 1950 |
| 2,535,231 | Rasmussen | Dec. 26, 1950 |